US008219517B2

(12) United States Patent
Wei

(10) Patent No.: US 8,219,517 B2

(45) Date of Patent: Jul. 10, 2012

(54) MULTI-CLASS POISSON DISK SAMPLING

(75) Inventor: Li-Yi Wei, Redwood City, CA (US)

(73) Assignee: Microsoft Corporation, Redmond, WA (US)

( * ) Notice: Subject to any disclaimer, the term of this patent is extended or adjusted under 35 U.S.C. 154(b) by 546 days.

(21) Appl. No.: 12/509,504

(22) Filed: Jul. 27, 2009

(65) Prior Publication Data

US 2011/0019908 A1 Jan. 27, 2011

(51) Int. Cl.
*G06F 15/00* (2006.01)

(52) U.S. Cl. .......................................... 706/62; 345/418

(58) Field of Classification Search ..................... 706/62
See application file for complete search history.

(56) References Cited

U.S. PATENT DOCUMENTS

| | | | | |
|---|---|---|---|---|
| 5,519,789 | A | 5/1996 | Etoh | |
| 6,829,323 | B2 | 12/2004 | Toth et al. | |
| 2011/0013842 | A1 * | 1/2011 | Wei | 382/190 |
| 2011/0292066 | A1 * | 12/2011 | Wei | 345/589 |

OTHER PUBLICATIONS

Lagae et al (A comparison of Methods for Generating Poisson Disk Distribution 2008).*

Lu et al ("A Theory for Sampling Signals from a Union of Subspaces" Jun. 2008).*

Li-Yi Wei ("Multi-class Poisson Disk Sampling" 2010).*

Wei, Li-Yi, "Multi-Class Poisson Disk Sampling," retrieved at <<http://research.microsoft.com/pubs/80181/paper.pdf>>, Technical Report No. MSR-TR-2009-2010, Microsoft Corporation, Redmond, WA, Jan. 2009, 13 pages.

Gamito, et al., "Fast Poisson-Disc Sample Generation in n-Dimensional Space by Subdivision Refinement," retrieved at <<http://www.dcs.shef.ac.uk/~steve/publications/CS0811.pdf>>, Research Memorandum No. CS-08-11, Department of Computer Science, The University of Sheffield, 2008, 20 pages.

Akenine-Moller, et al., "Stochastic Rasterization Using Time-Continuous Triangles," Proceedings of the 22nd ACM SIGGRAPH/EUROGRAPHICS Symposium on Graphics Hardware, 2007, retrieved at <<http://graphics.cs.Ith.se/research/papers/2007/stochrast/stochrast2007.pdf>>, 11 pages.

Ben Ezra, et al., "Penrose Pixels Superresolution in the Detector Layout Domain," ICCV '07: Proceedings of the International Conference on Computer Vision, 2007, accessible at <<http://www.ben-ezra.org/Papers/BenEzra_ICCV07.pdf>>, 8 pages.

Bridson, Robert, "Fast Poisson Disk Sampling in Arbitrary Dimensions," International Conference on Computer Graphics and Interactive Techniques, ACM SIGGRAPH 2007, Article No. 22, 2007, retrieved at <<http://www.cs.ubc.ca/~rbridson/docs/bridson-siggraph07-poissondisk.pdf>>, 1 page.

Cohen, et al., "Wang Tiles for Image and Texture Generation," ACM Transactions on Graphics, vol. 22, Issue 3, Jul. 2003, Proceedings of ACM SIGGRAPH 2003, 2003, accessible at <<http://research.microsoft.com/en-us/um/people/cohen/wangfinal.pdf>>, 8 pages.

(Continued)

*Primary Examiner* — Jeffrey A Gaffin
*Assistant Examiner* — Lut Wong

(57) ABSTRACT

A multi-class sampling component (MCSC) is described for selecting samples associated with two or more sampling classes to produce output information. The overall set of samples in the output information exhibits a desirable Poisson distribution. Further, each subset of samples associated with each respective class exhibits a Poisson distribution. The MCSC selects samples based on intra-class radius information (describing the minimum allowed distances between same-class samples) and inter-class radius information (describing the minimum allowed distances between different-class samples). The MCSC can be applied to different applications, such as an object placement application, a color stippling application, a sensor design application, and so on.

19 Claims, 16 Drawing Sheets

OTHER PUBLICATIONS

Cook, et al., "Stochastic Simplification of Aggregate Detail," ACM Transactions on Graphics, vol. 26, Issue 3, Jul. 2007, Proceedings of ACM SIGGRAPH 2007, Article No. 79, 2007, accessible at <<http://graphics.pixar.com/library/StochasticSimplification/paper.pdf>>, 8 pages.

Dunbar, et al., "A Spatial Data Structure for Fast Poisson-Disk Sample Generation," ACM Transactions on Graphics, vol. 25, Issue 3, Jul. 2006, Proceedings of ACM SIGGRAPH 2006, 2006, retrieved at <<http://www.cs.virginia.edu/~gfx/pubs/antimony/antimony.pdf>>, 6 pages.

Feng, et al., "Anisotropic Noise Samples," IEEE Transactions on Visualization and Computer Graphics, vol. 14, Issue 2, Mar.-Apr. 2008, pp. 342-354, retrieved at << http://www.cipic.ucdavis.edu/~hamann/FengHotzHamannJoyIEEE_TVCGRevisionAsAccepted06222007.pdf>>, 12 pages.

Fu, et al., "Direct Sampling on Surfaces for High Quality Remeshing," ACM Symposium on Solid and Physical Modeling, Proceedings of the 2008 ACM Symposium on Solid and Physical Modeling, 2008, pp. 115-124.

Jones, Thouis R., "Efficient Generation of Poisson-Disk Sampling Patterns," Journal of Graphics Tools, vol. 11, No. 2, Apr. 24, 2006, retrieved at <<http://people.csail.mit.edu/thouis/JonesPoissonPreprint.pdf>>, 10 pages.

Kim, et al., "Jigsaw Image Mosaics," International Conference on Computer Graphics and Interactive Techniques, Proceedings of the 29th Annual Conference on Computer graphics and Interactive Techniques, 2002, retrieved from <<http://www.cs.cornell.edu/people/jkim/JIM/JigsawImageMosaics.pdf>>, 8 pages.

Kim, et al., "Featureguided Image Stippling," Eurographics Symposium on Rendering, vol. 27, No. 4, 2008, retrieved at << http://cg.postech.ac.kr/research/stippling/stippling_paper.pdf>>, 8 pages.

Kopf, et al., "Recursive Wang Tiles for Real-Time Blue Noise," ACM Transactions on Graphics, Proceedings of SIGGRAPH 2006, vol. 25, Issue 3, 2006, retrieved at <<http://johanneskopf.de/publications/blue_noise/paper/Recursive_Wang_Tiles_For_Real-Time_Blue_Noise.pdf>>, 10 pages.

Lagae, et al., "A Procedural Object Distribution Function," ACM Transactions on Graphics, vol. 24, Issue 4, Oct. 2005, pp. 1442-1461, accessible at <<http://www.cs.kuleuven.ac.be/~ares/publications/LD05PODF/LD05PODF.pdf>>, 20 pages.

Lagae, et al., "An Alternative for Wang Tiles: Colored Edges Versus Colored Corners," ACM Transactions on Graphics, vol. 25, Issue 4, Oct. 2006, pp. 1442-1459, accessible at <<http://www.cs.kuleuven.ac.be/~ares/publications/LD06AWTCECC/LD06AWTCECC.pdf>>, 18 pages.

Lagae, et al., "A Comparison of Methods for Generating Poisson Disk Distributions," Computer Graphics Forum, vol. 27, No. 1, Mar. 2008, pp. 114-129, retrieved at <<http://www.cs.kuleuven.be/~graphics/publications/LD08CMGPD/LD08CMGPD.pdf>>, 16 pages.

McClure, M. "A Stochastic Cellular Automaton for Three-Coloring Penrose Tiles," Computers & Graphics, Jul. 16, 2001, pp. 519-524, accessible at <<http://www.cs.unca.edu/~mcclure/professional/Penrose3Color.pdf>>, 15 pages.

McCool, et al., "Hierarchical Poisson Disk Sampling Distributions," Proceedings of the Conference on Graphics Interface'92, 1992, pp. 94-105, retrieved at <<http://www.dgp.toronto.edu/~elf/.misc/poissondisk.pdf>>, 12 pages.

Mitchell, Don P., "Generating Antialiased Images at Low Sampling Densities," Computer Graphics, vol. 21, No. 4, 1987, pp. 65-72.

Ostromoukhov, et al., "Multi-Color and Artistic Dithering," Proceedings of the 26th Annual Conference on Computer graphics and Interactive Techniques, 1999, pp. 425-432, retrieved from << http://diwww.epfl.ch/w3lsp/publications/microstructureimaging/maad.pdf>>, 9 pages.

Ostromoukhov, et al., "Fast Hierarchical Importance Sampling with Blue Noise Properties," International Conference on Computer Graphics and Interactive Techniques, ACM SIGGRAPH 2004 Papers, 2004, pp. 488-495, retrieved at <<http://www.iro.umontreal.ca/~ostrom/publications/pdf/SIGGRAPH04_ImportanceSampling.pdf>>, 8 pages.

Ostromoukhov, Victor, "Sampling with Polyominoes," ACM Transactions on Graphics, vol. 26, Issue 3, Jul. 2007, Proceedings of ACM SIGGRAPH 2007, Article No. 78, 2007, retrieved at << http://www.iro.umontreal.ca/~ostrom/publications/pdf/SIGGRAPH07_SamplingWithPolyominoes.pdf>>, 6 pages.

Pang, et al., "Structure-Aware Halftoning," International Conference on Computer Graphics and Interactive Techniques, ACM SIGGRAPH 2008, Article No. 89, 2008, retrieved at << http://www.cse.cuhk.edu.hk/~ttwong/papers/structurehalftone/paper/texhalftone.pdf>>, 8 pages.

Turk, Greg, "Re-Tiling Polygonal Surfaces," ACM SIGGRAPH Computer Graphics, vol. 26, Issue 2, Jul. 1992, pp. 55-64, retrieved at << http://www.cc.gatech.edu/~turk/my_papers/retile.pdf>>, 10 pages.

Wei, Li-Yi, 2008, "Parallel Poisson Disk Sampling," ACM Transactions on Graphics, vol. 27, Issue 3, Aug. 2008, Proceedings of ACM SIGGRAPH 2008, Article No. 20, retrieved at <<http://research.microsoft.com/pubs/70563/tr-2008-46.pdf>>, 10 pages.

White, et al., "Poisson Disk Point Sets by Hierarchical Dart Throwing," IEEE Symposium on Interactive Ray Tracing, Sep. 10-12, 2007, 4 pages.

Yellott, John. I., "Spectral Consequences of Photoreceptor Sampling in the Rhesus Retina," Science, vol. 221, Issue 4608, Jul. 22, 1983, pp. 382-385, retrieved at <<http://www.sciencemag.org>>.

* cited by examiner

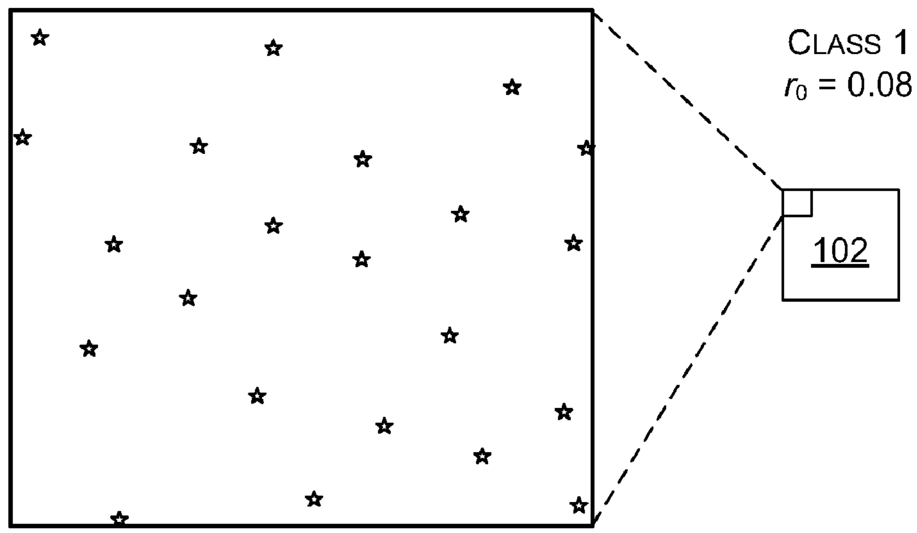
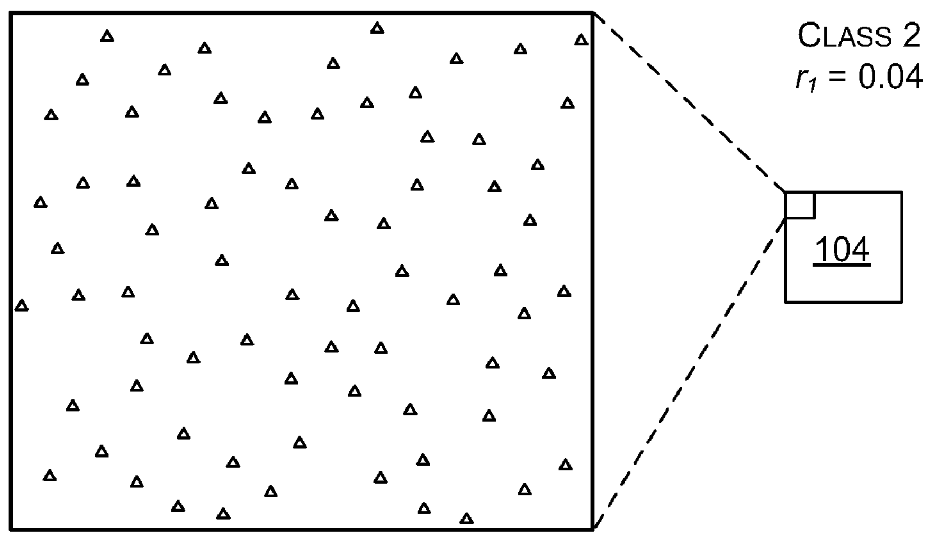
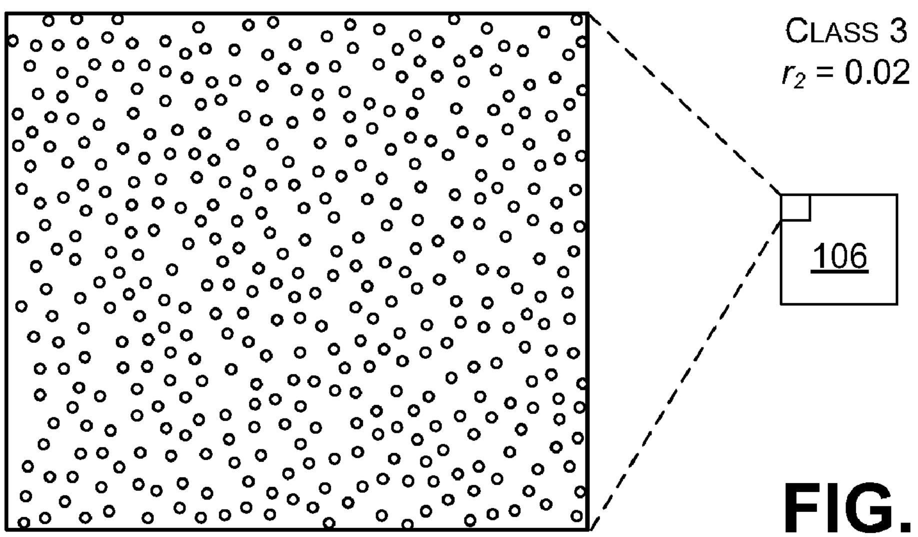
FIG. 1

```
function S ← MultiClassDartThrowing(Ω, { r_i }_{i=0:c-1})

// Ω : sampling domain
// { r_i } : user specified parameters for intra-class sample spacing
// c : number of classes
// r : c x c matrix controlling inter-class sample spacing
r ← BuildRMatrix({ r_i }_{i=0:c-1} ) // see Fig. 8 — 602
S ← ∅ // final set of samples — 604
while not enough trials attempted and not enough samples in S
    s ← new sample uniform-random drawn from Ω — 608
    c_s ← argmin_c FillRate(c) // choose the most under-filled class — 610
    if ∀ s' ∈ S |s - s'| ≥ r(c_s, c_s') — 612
        add s to S — 614
    else if impossible to add another sample to c_s
        // try to remove the set of conflicting samples N_s
        N_s ← U s' ∈ S where |s - s'| < r(c_s, c_s') — 618
        if Removable(N_s, s, r) — 620
            remove N_s from S — 622
            add s to S — 624
        end
    end
end
return S
```

616

606

SAMPLE SELECTION COMPONENT 516

```
function float FillRate(c)

return  number of existing samples ∈ c  /  target number of samples for c   // see Equation (1)
```

CLASS SELECTION COMPONENT 520

```
function bool Removable (N_s, s, r)

foreach s' ∈ N_s
    if r(c_s', c_s') ≥ r(c_s, c_s) or FillRate(c_s') < FillRate(c_s)
        return false
return true
```

SAMPLE REMOVAL COMPONENT 522

FIG. 6

```
function r ← BuildRMatrix({ r_i }_{i=0:c-1} )

// { r_i } : user specified per-class values
// c : number of classes
for i = 0 to c-1
    r(i, i) ← r_i // initialize diagonal entries                    802
end
sort the c classes into priority groups { P_k }_{k=0:p-1} with decreasing r_i    804
// classes in the same priority group have identical r values
C ← ∅  // the set of classes already processed
D ← 0  // the density of the classes already processed
for k = 0 to p-1
    C ← C U P_k                                                     808
    foreach class i ∈ P_k
        D ← D + 1/r_i^n  // n is the dim of the sample space        810
    end
    foreach class i ∈ P_k
        foreach class j ∈ C
            if i ≠ j
                r(i, j) ← r(j, i) ← 1/ⁿ√D   // r is symmetric         812
        end
    end
end                                                                 806
return r
```

MATRIX GENERATION COMPONENT 518

FIG. 8 function $S \leftarrow$ MultiClassDartThrowing($\Omega$, $\{ r_i(.) \}_{i=0:c-1}$) (Adaptive Version) 908

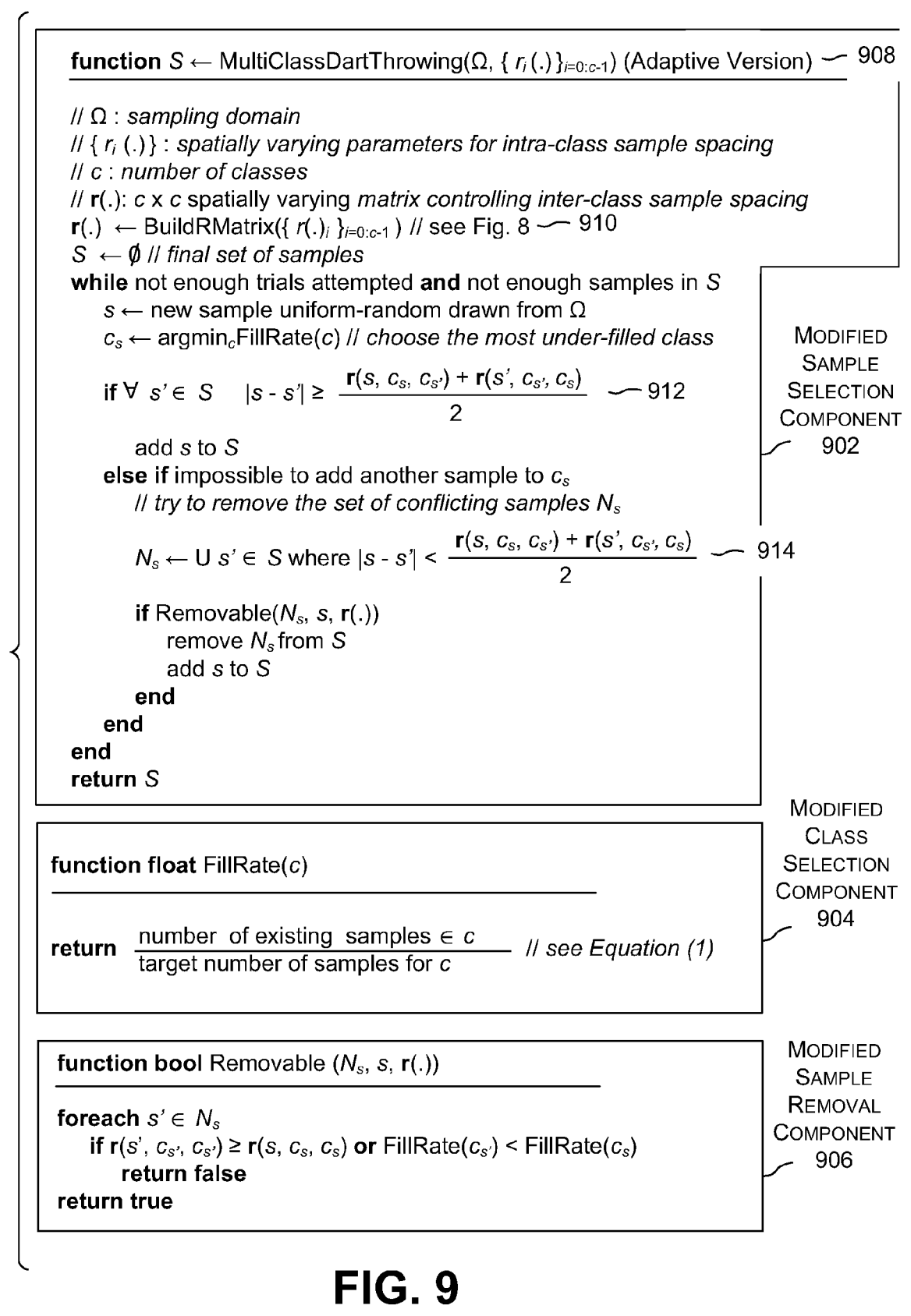

// $\Omega$ : *sampling domain*
// $\{ r_i(.) \}$ : *spatially varying parameters for intra-class sample spacing*
// $c$ : *number of classes*
// $\mathbf{r}(.)$: $c$ x $c$ spatially varying *matrix controlling inter-class sample spacing*
$\mathbf{r}(.) \leftarrow$ BuildRMatrix($\{ r(.)_i \}_{i=0:c-1}$) // see Fig. 8 910
$S \leftarrow \emptyset$ // *final set of samples*
while not enough trials attempted and not enough samples in $S$
 $s \leftarrow$ new sample uniform-random drawn from $\Omega$
 $c_s \leftarrow \text{argmin}_c\text{FillRate}(c)$ // *choose the most under-filled class* if $\forall\ s' \in S \quad |s - s'| \geq \frac{\mathbf{r}(s, c_s, c_{s'}) + \mathbf{r}(s', c_{s'}, c_s)}{2}$ 912 add $s$ to $S$
 else if impossible to add another sample to $c_s$
  // *try to remove the set of conflicting samples* $N_s$ $N_s \leftarrow \cup\ s' \in S$ where $|s - s'| < \frac{\mathbf{r}(s, c_s, c_{s'}) + \mathbf{r}(s', c_{s'}, c_s)}{2}$ 914 if Removable($N_s$, $s$, $\mathbf{r}(.)$)
   remove $N_s$ from $S$
   add $s$ to $S$
  end
 end
end
return $S$

MODIFIED SAMPLE SELECTION COMPONENT 902 function float FillRate($c$)

return $\frac{\text{number of existing samples} \in c}{\text{target number of samples for } c}$ // *see Equation (1)*

MODIFIED CLASS SELECTION COMPONENT 904 function bool Removable ($N_s$, $s$, $\mathbf{r}(.)$)

foreach $s' \in N_s$
 if $\mathbf{r}(s', c_{s'}, c_{s'}) \geq \mathbf{r}(s, c_s, c_s)$ or FillRate($c_{s'}$) < FillRate($c_s$)
  return false
return true

MODIFIED SAMPLE REMOVAL COMPONENT 906

FIG. 9

Figure 10:
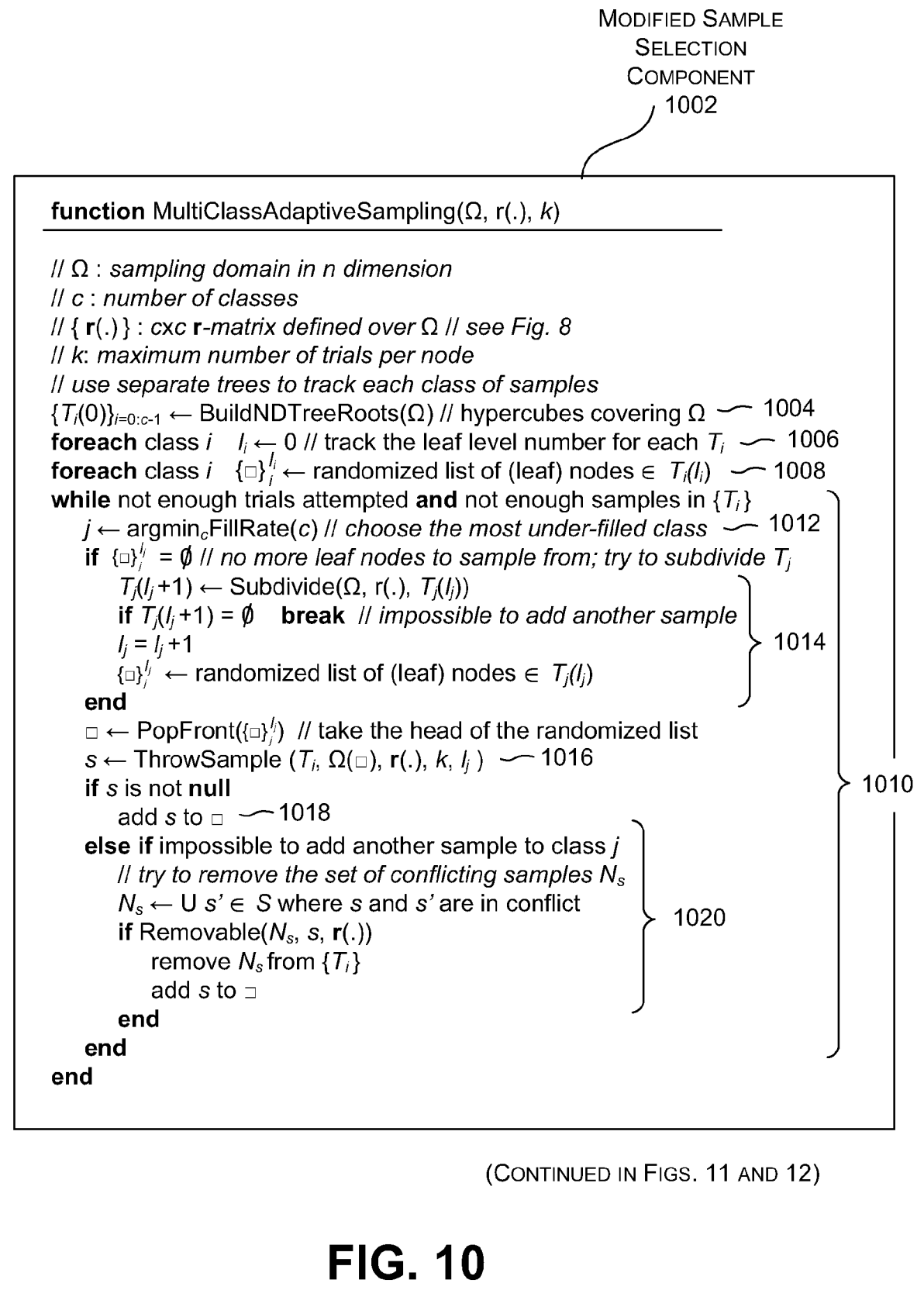

```
function MultiClassAdaptiveSampling(Ω, r(.), k)

// Ω : sampling domain in n dimension
// c : number of classes
// { r(.) } : cxc r-matrix defined over Ω // see Fig. 8
// k: maximum number of trials per node
// use separate trees to track each class of samples
{T_i(0)}_{i=0:c-1} ← BuildNDTreeRoots(Ω) // hypercubes covering Ω
foreach class i   l_i ← 0 // track the leaf level number for each T_i
foreach class i   {□}_i^{l_i} ← randomized list of (leaf) nodes ∈ T_i(l_i)
while not enough trials attempted and not enough samples in {T_i}
   j ← argmin_c FillRate(c) // choose the most under-filled class
   if {□}_j^{l_j} = ∅ // no more leaf nodes to sample from; try to subdivide T_j
      T_j(l_j+1) ← Subdivide(Ω, r(.), T_j(l_j))
      if T_j(l_j+1) = ∅   break // impossible to add another sample
      l_j = l_j+1
      {□}_j^{l_j} ← randomized list of (leaf) nodes ∈ T_j(l_j)
   end
   □ ← PopFront({□}_j^{l_j}) // take the head of the randomized list
   s ← ThrowSample (T_i, Ω(□), r(.), k, l_j )
   if s is not null
      add s to □
   else if impossible to add another sample to class j
      // try to remove the set of conflicting samples N_s
      N_s ← U s' ∈ S where s and s' are in conflict
      if Removable(N_s, s, r(.))
         remove N_s from {T_i}
         add s to □
      end
   end
end
```

SUBDIVIDE COMPONENT 1102

(CONTINUED FROM FIG. 10)

```
function (T(l+1) ← Subdivide(Ω, r(.), T(l))
____________________________________________
i = class number for T
foreach node □ of T(l)
    if ∃ s ∈ □ and √n μ (□) > r(s, i, i)    ~ 1106
    // subdivide □ only if likely to add another sample
    // μ (□) is the cell size of □
        subdivide □ into 2^n child nodes // n is the dimension of Ω    ~ 1108
        migrate s into the child □' where s ∈ Ω(□')    ~ 1110
    end
end
T(l+1) ← newly created nodes
return T(l+1)
```

```
function s ← ThrowSample ({T_i}, Ω(□), r(.), k, l )

foreach trail 1 to k
    s ← sample uniformly drawn from Ω(□)
    if ∀ s'∈ T   S |s - s'| ≥ max(r(s, c_s, c_s'), r(s', c_s', c_s))
    // this can be done by examining only s'∈ neighboring nodes in T_{c_s'}
    // within hyper-sphere of radius 3√n μ (l ') at level l ' = 0 to l
    // for each node in level l of T_{c_s'} look at samples under its subtree

    // can also use the mean metric (r(s, c_s, c_s') + r(s', c_s', c_s)) / 2 in Fig. 9

    // in this case, use hyper-sphere radius 5√n μ (l ') above
    // and ½ r(s, i, i) in Subdivide( )
    return s
end
return null
```

THROW SAMPLE COMPONENT 1104

FIG. 11

(CONTINUED FROM FIG. 10)

```
function bool Removable (N_s, s, r(.))
______________________________________
foreach s' ∈ N_s
    if r(s', c_s', c_s') ≥ r(s, c_s, c_s) or FillRate(c_s') < FillRate(c_s)
        or level (s') < level(s)
            return false
return true
```

MODIFIED SAMPLE REMOVAL COMPONENT 1202

MULTI-CLASS POISSON DISK SAMPLING

BACKGROUND

Sampling is a well known process in which samples are selected from a sampling domain to produce output information. For example, a graphics application may select a subset of image values from an original input image to produce an output image. In many scenarios, a sampling technique attempts to select samples in such a manner that the output information has desirable properties, such as desirable noise-related properties.

One technique for selecting samples is the dart-throwing technique described in Robert L. Cook, "Stochastic Sampling in Computer Graphics," *ACM Transactions on Graphics*, Vol. 5, Issue 1, 1986, pp. 51-72. This technique randomly selects a candidate sample from a sampling domain and then determines whether this sample is at least a minimum distance away from all existing (i.e., previously selected) samples in the output information. The technique accepts the candidate sample if it satisfies the minimum distance constraint. If the constraint is not satisfied, the technique investigates another randomly-selected candidate sample. By virtue of minimum distance constraint, the dart-throwing technique produces output information that exhibits a favorable Poisson disk distribution. In the context of a graphics application, a Poisson distribution exhibits a blue noise power spectrum, replacing low frequency aliasing with high frequency noise, which corresponds to a less annoying artifact.

While useful, known Poisson-related sampling techniques have various limitations. For example, Poisson sampling techniques treat all samples in a sampling domain in the same manner; this yields output information that includes a single class of samples. Yet many real-world phenomena exhibit a mix of different types of features that can be conceptualized as different classes of sampling domains. Known Poisson-related sampling techniques do not address the challenges associated with processing this type of multi-class information.

SUMMARY

According to one illustrative implementation, a multi-class sampling component (MCSC) is described for selecting samples associated with two or more sampling classes to produce multi-class output information. The MCSC operates in such a manner that the overall set of samples in the output information exhibits a Poisson distribution. Further, each subset of samples associated with each respective class exhibits a Poisson distribution.

According to one illustrative aspect, the MCSC selects the samples based on constraint information. The constraint information includes intra-class radius information and inter-class radius information. The intra-class radius information describes the minimum accepted distances between same-class samples (e.g., the distance between any two samples in a class X). In one case, a user may supply the intra-class radius information. The inter-class radius information describes the minimum accepted distances between different-class samples (e.g., the distance between a sample in class X and a sample in class Y). In one case, the MCSC can generate the inter-class radius information based on the intra-class radius information. The constraint information can be expressed as an r-matrix which includes the intra-class radius information as diagonal element values and the inter-class radius information as off-diagonal element values.

According to another illustrative aspect, the MCSC can add a candidate sample s to the output information by first identifying a class that is currently the most under-filled among the classes. The MCSC then determines whether the candidate sample s is at least a prescribed distance away from each existing sample s' in the output information, as specified by the constraint information. The MCSC adds the candidate sample s to the output information if it satisfies this distance criterion. The MCSC investigates another candidate sample s if the constraint information is not satisfied.

According to another illustrative aspect, the MCSC can assess whether it is impossible to add any candidate sample to the identified class. If so, the MCSC can remove one or more existing samples, and then add the candidate sample s to the output information.

According to another illustrative aspect, the constraint information can specify constant radius information (to provide a uniform sampling mode of operation) and/or spatially-varying radius information (to provide an adaptive sampling mode of operation).

According to another illustrative aspect, the MCSC can employ one or more acceleration techniques to expedite the selection of samples. For example, the MCSC can use a multi-resolution sample-selection technique. In such a technique, each class can be represented by a hierarchical data structure (e.g., a tree); the nodes in such a data structure represent cells for receiving samples.

According to another illustrative aspect, the MCSC can use the output information to determine the placement of items in the context of any application. In one case, the application corresponds to an object placement application, and the items correspond to physical objects. In another case, the application corresponds to a color stippling application, and the items correspond to color dots placed within an output image. In another application, the application corresponds to a sensor design application, and the items correspond to sensor elements or filter elements.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1 shows different sets of samples generated by a multi-class sampling component (MCSC), associated with different respective sample classes.

FIG. 6 shows illustrative functionality that can be used to implement the MCSC of FIG. 5; in this version, the functionality performs a uniform sampling operation.

FIG. 8 shows illustrative functionality that can be used to generate an r-matrix for use by the MCSC of FIG. 5.

FIG. 9 shows additional functionality that can be used to implement the MCSC of FIG. 5; in this version, the functionality performs an adaptive sampling operation.

FIGS. 10-12 show additional functionality that can be used to implement the MCSC of FIG. 5; in this version, the functionality performs sampling with respect to a plurality of resolutions.

FIG. 13 is a graphical depiction of the manner in which the functionality of FIGS. 10-12 can place a candidate sample s among a set S of existing samples in a multi-resolution context.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an approach for producing output information subject to multi-class selection constraints. The disclosure is organized as follows. Section A describes illustrative systems for performing the above-summarized functions. Section B describes illustrative methods which explain the operation of the systems of Section A. And Section C describes illustrative processing functionality that can be used to implement any aspect of the features described in Sections A and B.

Figure 19:
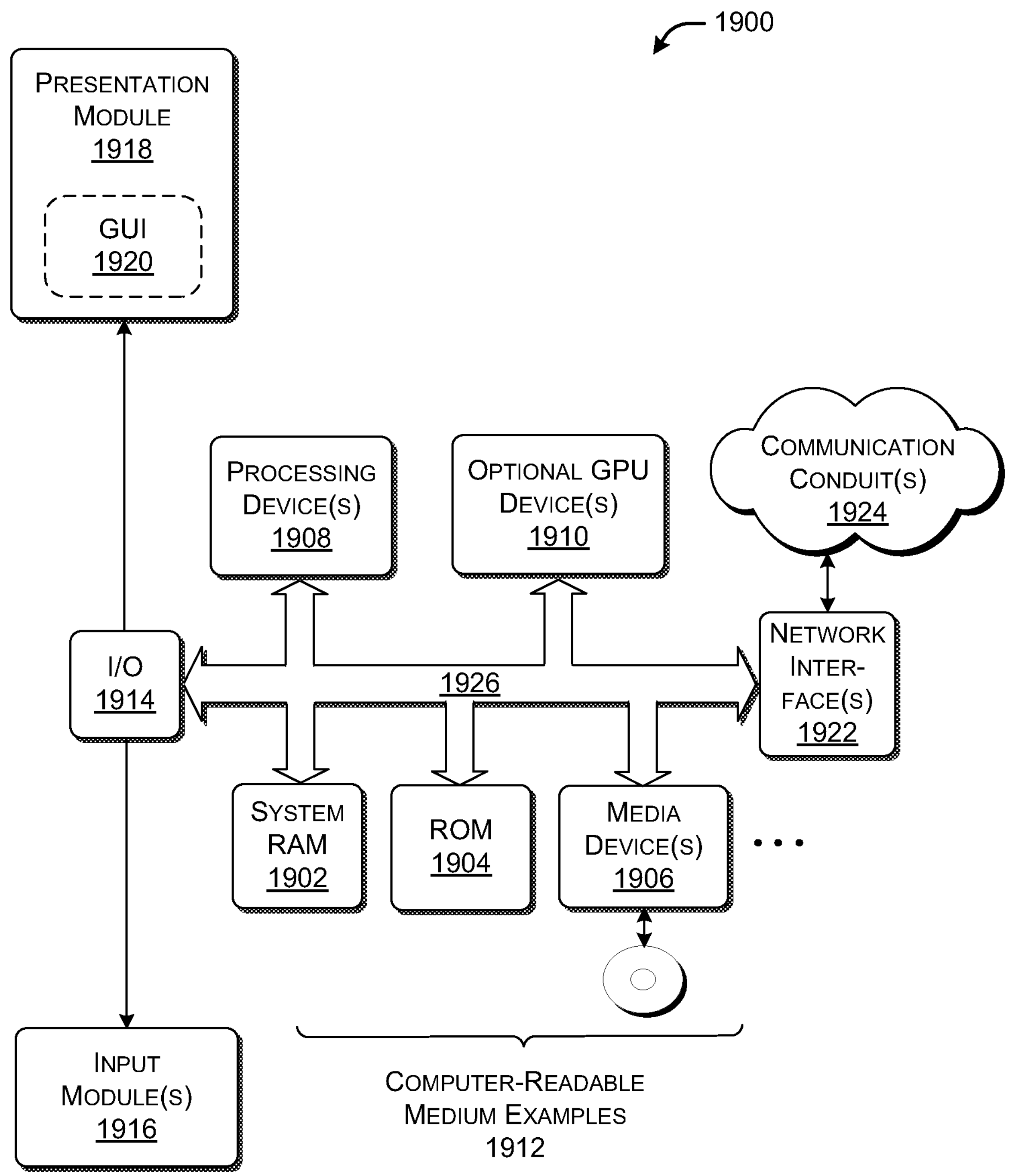
FIG. 19 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 19, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented by software, hardware (e.g., discrete logic components, etc.), firmware, manual processing, etc., or any combination of these implementations.

As to terminology, the phrase "configured to" encompasses any way that any kind of functionality can be constructed to perform an identified operation. The functionality can be configured to perform an operation using, for instance, software, hardware (e.g., discrete logic components, etc.), firmware etc., and/or any combination thereof.

The term "logic component" encompasses any functionality for performing a task. For instance, each operation illustrated in the flowcharts corresponds to a logic component for performing that operation. An operation can be performed using, for instance, software, hardware (e.g., discrete logic components, etc.), firmware, etc., and/or any combination thereof. When implemented by a computing system or other electrical apparatus, a logic component represents an electrical component that is a physical part of the electrical apparatus, however implemented.

A. Illustrative Systems

A.1. Overview of the Generation of Multi-Class Output Information

A multi-class sampling component (MCSC) selects samples from at least two different classes to produce multi-class output information. As to terminology, a sampling domain broadly refers to space or governing framework from which possible samples may be selected. In one case, a sampling domain may be associated with an actual collection of data items. For example, a sampling domain may correspond to an original digital image having data items associated with respective image elements. In this scenario, the MCSC may operate to select a subset of data items from this actual collection to produce an output image. In another case, a sampling domain defines a theoretical space from which samples may be selected. In either case, a sampling domain can define a continuous space (providing a continuous range of data items), a discrete space (providing discrete data items), or a combination thereof. The sampling domain can have any number of dimensions.

A sample refers to any type of data item selected from a sampling domain. A sample may convey various fields of information. For instance, one part of a sample may identify a location of the sample within the sample domain. Another part of a sample may convey at least one characteristic associated with the identified location. For example, a sample received from an input image may describe at least one color value associated with a particular location in the input image.

A sample class refers to a category of samples. The category can be defined with respect to at least one common characteristic of the samples. For example, a class of samples may pertain to image elements associated with a particular color (such as red, green, or blue). Another class of samples may pertain to a type of physical object, and so on. No limitation is placed on the criterion or criteria used to define a sample class.

The term input information corresponds to any information used by the MCSC to generate the output information. The input information may include information that describes the sampling domain. Further, as will be described, the input information may include radius information which defines constraints on the selection of samples. The term output information corresponds to output that is constituted through the samples selected from the sampling domain.

Figure 2:
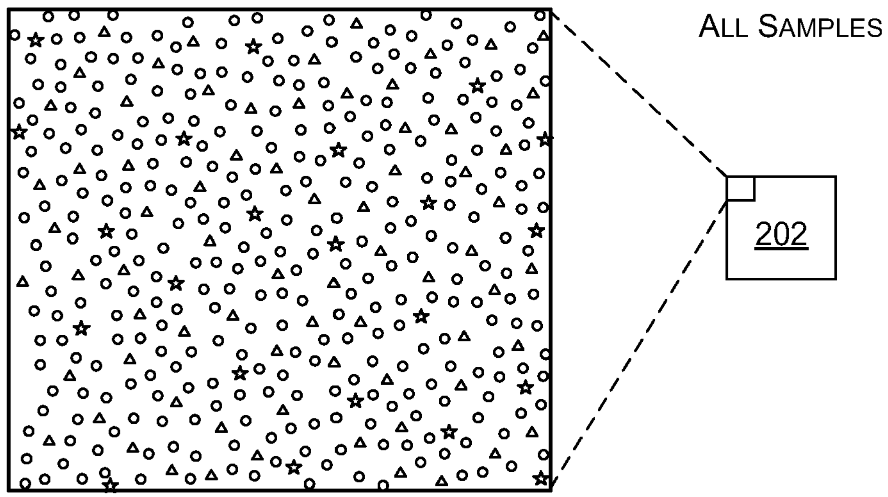
FIG. 2 shows an aggregate set of samples produced by combining the sets of samples of FIG. 1.

With the above terminology in mind, next consider the introductory example of FIGS. 1 and 2. In this example, the MCSC operates by selecting samples from three different classes of samples. Accordingly, the MCSC generates output information that includes three respective subsets of samples combined together. FIG. 1 shows the three different subsets of samples in the output information, namely subset 102, subset 104, and subset 106. FIG. 2 shows an entire set 202 of samples that represents the aggregate of subset 102, subset 104, and subset 106.

The MCSC operates in such a manner that each subset (102, 104, 106) of samples exhibits or resembles the characteristics of a Poisson distribution. Likewise, the entire set 202 of samples exhibits or resembles the characteristics a Poisson distribution. A Poisson distribution has a blue noise spectrum which provides desirable noise-related properties. For example, in the context of a graphics application, the use of a Poisson distribution of samples can help reduce aliasing artifacts in an output image.

A Poisson distribution is characterized by the property that the samples are uniformly randomly distributed but subject to the constraint that each sample is separated from every other sample by at least a minimum distance, referred to herein as a radius value r. In a traditional example, the output information includes a single class of samples, so that a single radius value governs the placement of all of the samples within the output information. In the present case, the output information includes plural classes of samples. A single radius value is therefore insufficient to achieve the desired Poisson distribution summarized above with respect to FIGS. 1 and 2.

In the present multi-class case, two types of radius values govern the placement of samples: intra-class radius values and inter-class radius values. An intra-class radius value defines the minimum allowed distance between any two samples in a particular class of samples. An inter-class radius value defines the minimum allowed distance between samples in a pair of sample classes, e.g., any sample in a first sample class and any sample in a second sample class. The MCSC can organize the various radius values in an r-matrix, described in greater detail below. The intra-class radius values are generally referred to as intra-class radius information, while the inter-class radius values are generally referred to as inter-class radius information.

The intra-class and inter-class radius values can assume any values. For example, subset 102 of FIG. 1 corresponds to a sampling class with an intra-class radius value of $r_0$=0.08. Subset 104 corresponds to a sampling class with an intra-class radius value of $r_1$=0.04. And subset 106 correspond to a sampling class with an intra-class radius of $r_2$=0.02. In one example, the user (or other entity) manually supplies the intra-class radius values as part of the input information. As will be described below, the MCSC can generate the inter-class radius values based on the intra-class radius values.

Figure 3:
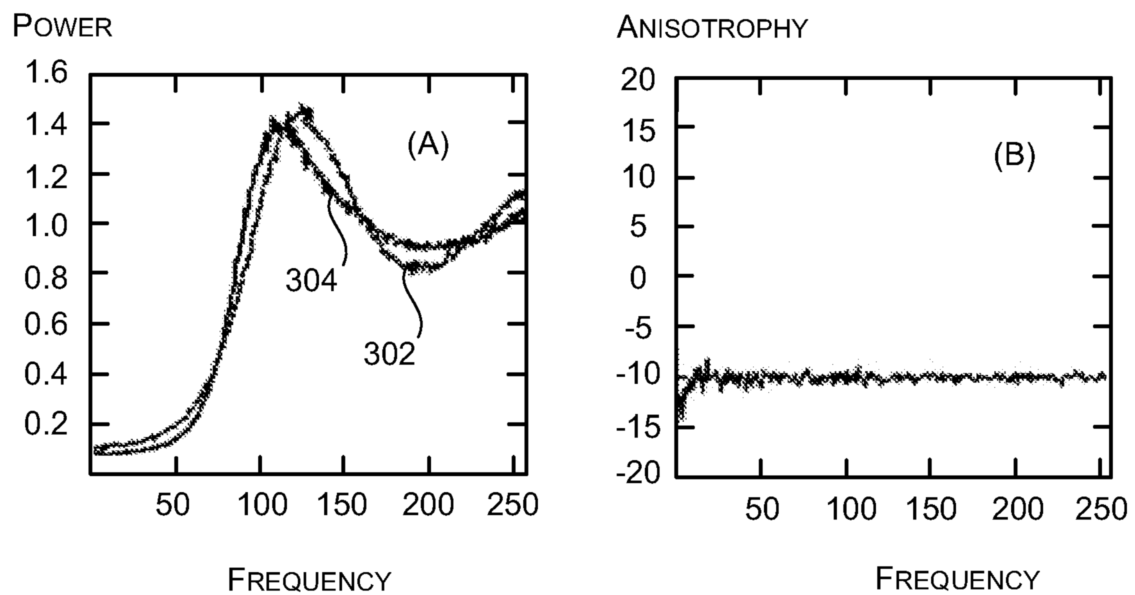
FIG. 3 shows graphs that convey the properties of an aggregate set of samples that combines two individual sets of samples associated with two respective classes.
Figure 4:
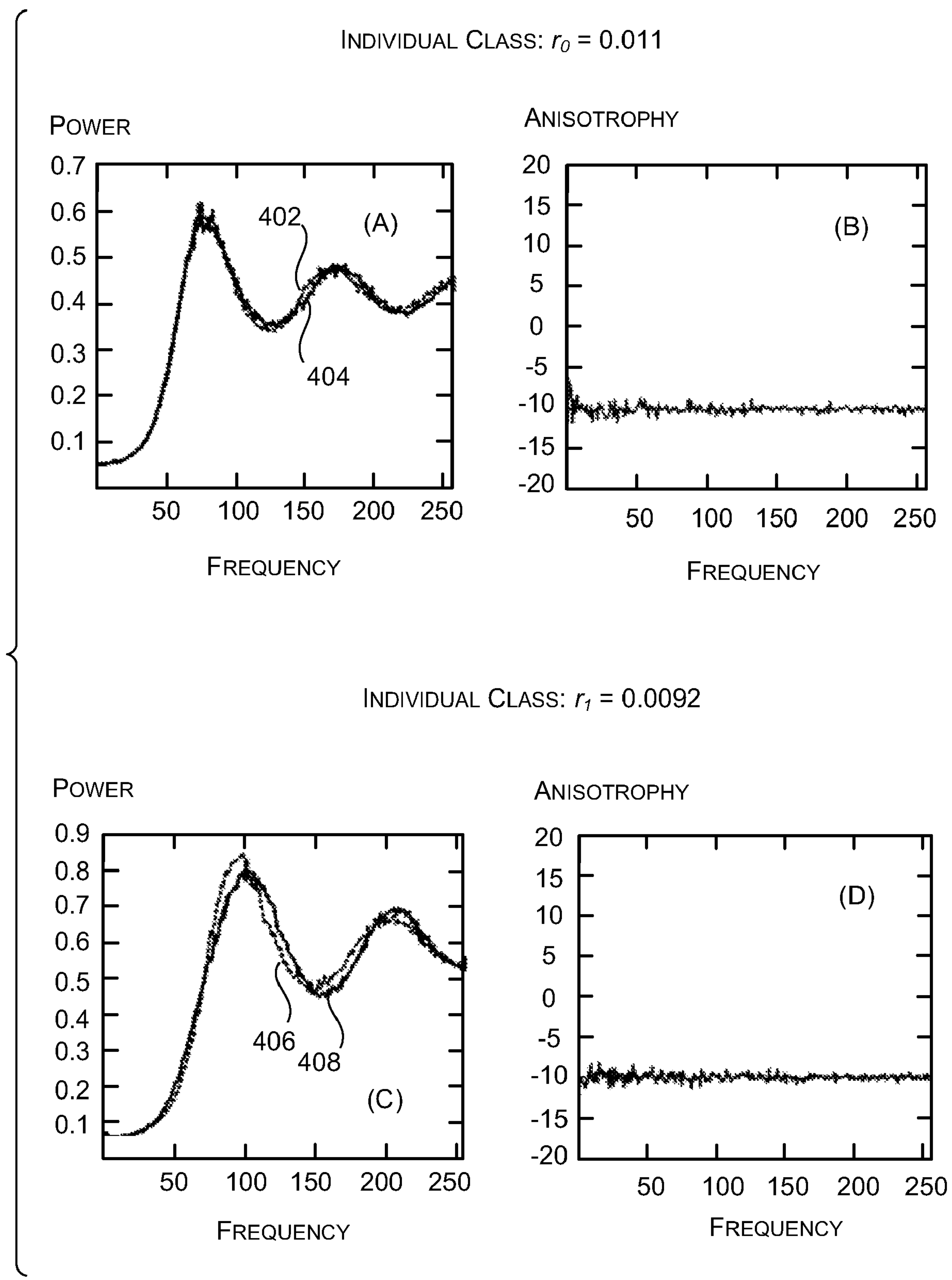
FIG. 4 shows graphs that convey the properties of the two individual sets of samples referred to above with respect to FIG. 3.

FIGS. 3 and 4 present a more formal demonstration of the Poisson characteristics of the output information. In this example, the MCSC generates output information for just two classes of samples. The first class has an intra-class radius value of $r_0$=0.011. The second class has an intra-class radius value of $r_1$=0.0092. FIG. 3 describes the properties of an aggregate set of samples produced by the MCSC based on these two sample classes. FIG. 4 describes the properties of each individual subset of samples in the output information. More specifically, the top two plots in FIG. 4 convey the characteristics of the $r_0$=0.011 subset of samples, while the bottom two plots convey the characteristics of the $r_1$=0.0092 subset of samples. The plots in FIGS. 3 and 4 correspond to radial mean plots and an anisotropy plots. Radial mean plots and anisotropy plots are types of graphs well understood in the art; a discussion of such graphs can be found in Lagae et al., "A Comparison of Methods for Generating Poisson Disk Distributions," *Computer Graphics Forum*, Vol. 27, No. 1., 2008, pp. 114-129.

For frame of reference, the radial mean plots include ground truth curves (302, 402, 406). These ground truth curves (302, 402, 406) represent the characteristics of output information produced by a single-class dart-throwing technique. These ground truth curves exhibit a characteristic shape associated with a Poisson distribution. The other curves (304, 404, 408) within the radial mean plots represent the characteristics of output information produced by the multi-class sampling technique described herein. As can be seen, the multi-class output results (shown by the curves (304, 404, 408)) closely resemble the ground truth curves (302, 402, 406). This validates the conclusion that the output results provided by the MCSC exhibit Poisson-type distribution, both in the context of the aggregate set of samples and each subset of per-class samples.

The MCSC also produces output results that may be more desirable compared to alternative hypothetical techniques that could be taken to address sampling in a multi-class environment. For example, assume that the MCSC separately applies a single-class dart-throwing operation to each class of samples. Then assume that the MCSC combines the output results produced by the separate dart-throwing operations. In this case, each separate output result may exhibit satisfactory Poisson characteristics, but in combination, the samples may be highly non-uniform. For many applications, this will be an undesirable outcome. For example, this approach can produce an inefficient distribution of items. Alternatively, or in addition, this approach can result in interference among items, causing noise or other undesirable characteristics.

Alternatively assume that the MCSC applies a single-class dart-throwing technique to all of the samples taken together without regard to its constituent classes of samples. In this case, the entire set of samples will exhibit satisfactory Poisson characteristics, but each subset of samples may be highly non-uniform. Again, this result can have negative consequences for different applications.

A.2. Overview of an Illustrative Implementation

Figure 5:
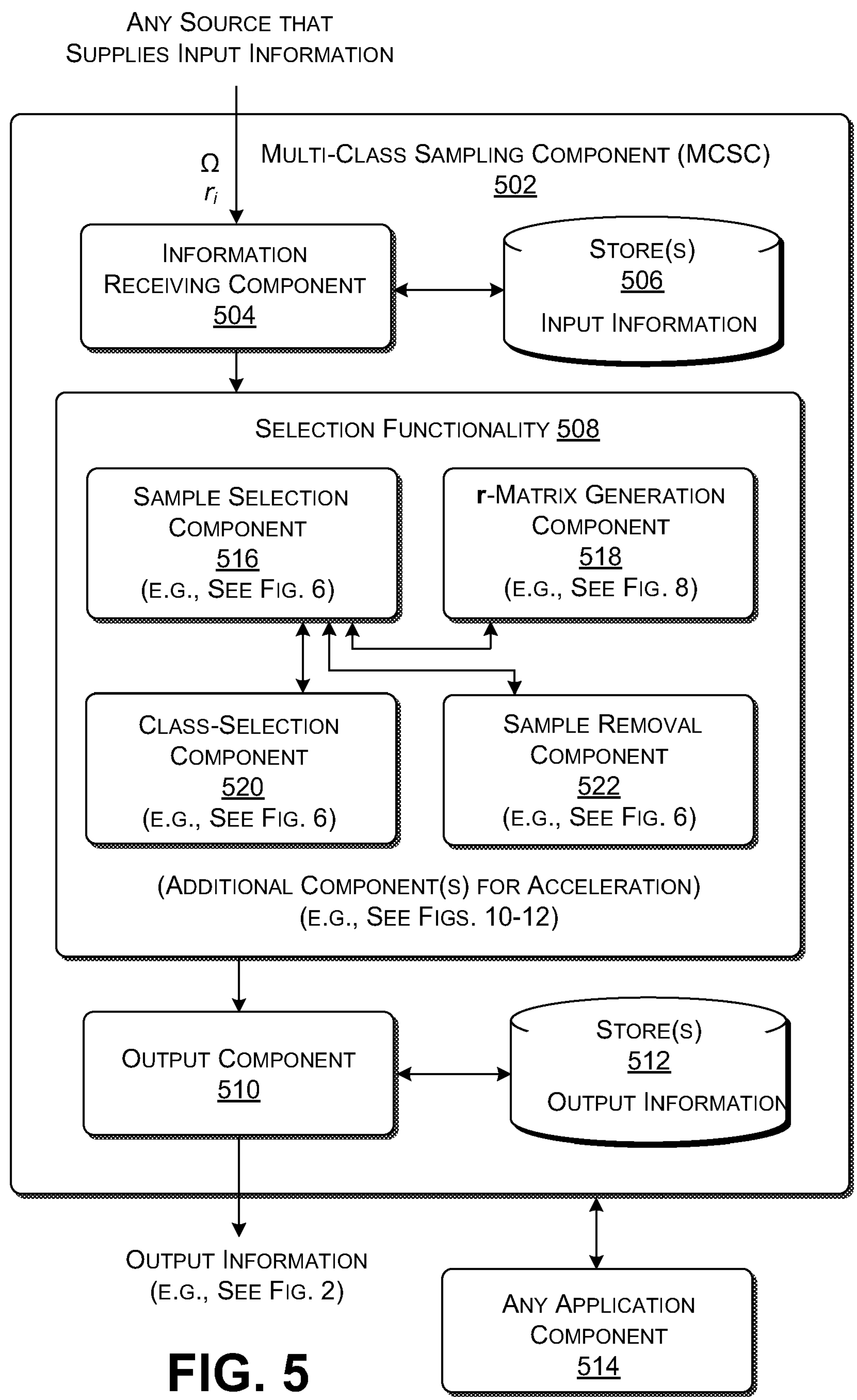
FIG. 5 shows an illustrative MCSC that can produce the results shown in FIGS. 1-4.

FIG. 5 shows an illustrative implementation of the multi-class sampling component (MCSC) 502. The MCSC 502 can include (or can be conceptualized to include) multiple sub-components, described below in turn.

An information receiving component 504 receives input information. The input information may include sample domain information that specifies the sample domain from which samples are to be selected. The input information can also specify the intra-class radius information. The intra-class radius information describes the minimum separation between samples within each class. The input information can include yet other control information that governs the operation of the MCSC 502. The information receiving component 504 can optionally store the input information in one or more stores 506.

Selection functionality 508 produces the output information. From a high-level perspective, the selection functionality 508 operates by selecting samples from different classes to constitute output information, as subject to constraint information. The constraint information depends on intra-class radius information and inter-class radius information. By virtue of the constraint information, the selection functionality 508 can also control the relative number of samples produced in each class of samples.

An output component 510 generates the output information provided by the selection functionality 508. The output component 510 can optionally store the output information in one or more stores 512.

An application component 514 uses the output information provided by the MCSC 502 to define the selection and arrangement of items in the context of any application. For example, the application component 514 may correspond to any kind of graphics component which uses the output information to provide an output image. Section A.7 (below) provides additional information regarding illustrative applications of the multi-class sampling technique provided by the MCSC 502.

The selection functionality 508 can include (or can be conceptualized to include) different subcomponents. A sample selection component 516 represents the main functionality for selecting samples from the sampling domain. As represented by the arrows, the sample selection component 516 interacts with other components in performing its main task.

An r-matrix generation component 518 generates a matrix which provides radius values that define the constraint information. The r-matrix specifies the intra-class radius values by its diagonal elements. The r-matrix specifies the inter-class radius values by its off-diagonal elements. The r-matrix generation component 518 generates the inter-class radius values based on the intra-class radius values. Section A.4 describes the r-matrix generation component 518 in greater detail.

A class selection component 520 determines the class that will be the recipient of a new sample at any given time during the operation of the sample selection component 516. In one case, the class selection component 520 identifies the class that is the most under-filled among the possible classes. The sample selection component 516 operates by attempting to add a sample to the identified class.

A sample removal component 522 removes one or more existing samples from the output information in the course of the sampling operation performed by the sample selection component 516. In one case, the sample removal component 522 removes one or more existing samples when it determines that it is impossible to add any candidate sample to a particular class of samples. By removing the existing samples, the sample selection component 516 is freed up to add a new candidate sample to the identified class of samples.

FIG. 6 shows a series of operations which can be used to implement the selection functionality 508. This version of the selection functionality 508 operates in a uniform sampling mode; in this mode, the radius values specified in the r-matrix remain constant. The operations illustrated in FIG. 5 will be generally described from top to bottom as follows.

In operation 602, the MCSC 502 builds the r-matrix, which is described in greater detail below in Section A.4.

In operation 604, the MCSC 502 initializes an output set S of samples that will constitute the output information.

In operation 606, the MCSC 502 commences a main iterative loop in which new samples s are added to the output information, e.g., the output set S. A sample s' refers to a sample that has been accepted and added to the output set S.

In operation 608, the MCSC 502, randomly selects a candidate sample s from the sampling domain. FIG. 6 denotes the sampling domain using the symbol Ω. The candidate sample s defines at least a sample location which governs the placement of the sample within the output information. The candidate sample s may also describe at least one property associated with the sample location, for example a color value associated with the sample location.

In operation 610, the MCSC 502 selects the class having the minimum fill rate, meaning the class that is most needful of samples at a current point in time. This is the class for which the MCSC 502 will attempt to add the randomly generated candidate sample s. The operations within the class selection component 520 provide one way of calculating the fill rate of a class. In that example, the fill rate corresponds to the number of existing samples in a particular class i divided by the target number of samples $N_i$ for the class i. The target number of samples, in turn, can be specified as:

$$N_i = N\frac{1/r_i^n}{\sum_{j=0}^{c-1}(1/r_j^n)}. \tag{1}$$

Here, N is the total number of target samples, n refers to the dimension of the output information, and $r_i$ refers to the specified intra-class minimum radius value for class i. The denominator of Equation (1) operates by summing $(1/r_j^n)$ over the possible classes (these classes having intra-class radius values $\{r_j\}$). Considered from a high-level perspective, operation 610 has the effect of adding samples to different classes in a balanced manner. This, in turn, means that the MCSC 502 can terminate its operation at any time and still provide balanced results that are not significantly biased towards any sample class.

In operation 612, the MCSC 502 determines whether it is possible to add the candidate sample s to the identified class. The MCSC 502 makes this decision based on the constraint information, which, in turn, is governed by the radius values in the r-matrix. More specifically, the MCSC 502 determines a distance between the candidate sample s and each neighboring sample s' in the output information, e.g., as specified by $|s-s'|$. For example, assume that the candidate sample is associated with class $c_s$, while an existing sample s' is associated with class $c_{s'}$. The MCSC 502 determines whether the distance $|s-s'|$ is greater than or equal to $r(c_s, c_{s'})$, where $r(c_s, c_{s'})$ refers to the radius value that constrains the placement of samples in class $c_s$ vis-à-vis samples in class $c_{s'}$, as defined, in turn, by the r-matrix. If this test is satisfied for each existing sample s', then the MCSC 502 adds the candidate sample s to the output information (in operation 614).

Figure 7:
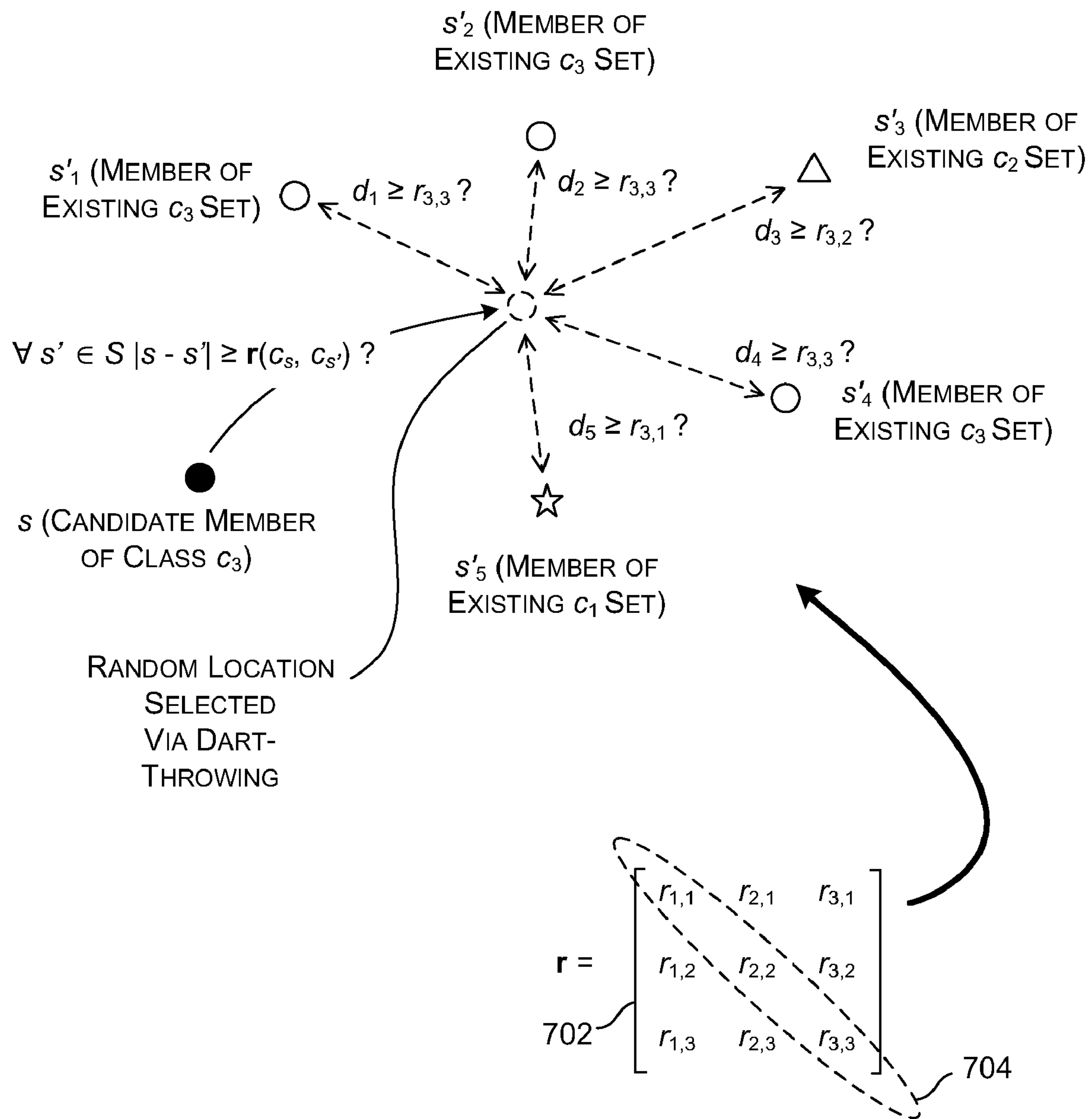
FIG. 7 is a graphical depiction of the manner in which the MCSC of FIG. 5 can place a candidate sample s among a set S of existing samples.

FIG. 7 shows an illustrative application of operation 612. Assume, in this case, that the MCSC 502 determines that class $c_3$ is in most need of a new sample. The MCSC 502 will then attempt to add a candidate sample s to this class $c_3$. Further assume that, at this point in time, the output information includes four nearby samples values, labeled $s'_1$, $s'_2$, $s'_3$, $s'_4$, and $s'_5$ (although the MCSC 502 can take into consideration all of the existing samples in the output information). The first existing sample $s'_1$ is a member of class $c_3$, which matches the class of the candidate sample s. Therefore, for this sample, the MCSC 502 performs its constraint-checking by determining whether the difference $|s-s'_1|$ is greater than or equal to the radius value $r_{3,3}$ in the r-matrix 702, which corresponds to the intra-class radius value for class $c_3$. As shown, the intra-class radius values correspond to diagonal elements 704 of the r-matrix 702. The MCSC 502 repeats this procedure for all the other existing samples s', some of which pertain to other classes, e.g., $c_1$, and $c_2$. The MCSC 502 performs its constraint checking with respect to an off-diagonal entry in the r-matrix 702 whenever it processes an existing sample s' associated with either class $c_1$ or class $c_2$. The MCSC 502 adds the candidate sample s to the output information if the constraint information is satisfied with respect to all of the existing samples s'.

A.3. Sample Removal Component

Returning to FIG. 6, operation 616 describes a procedure to remove one or more existing samples from the output information. The MCSC 502 invokes this procedure when it determines that it is impossible to add any sample value to the identified class of samples.

In operation 618, the MCSC 502 determines one or more samples $N_s$ that are in conflict with the candidate sample s. A samples s' is in conflict with the candidate sample s if $|s-s'|<r(c_s, c_{s'})$ In operation 620, the MCSC 502 determines whether it is possible to remove the identified existing samples $N_s$. This operation 622, in turn, invokes the sample removal component 522. In summary, the MCSC 502 determines that the samples can be removed if: (1) it is impossible to add another sample to class $c_s$; (2) each $s' \in N_s$ belongs to a class $c_{s'}$ with a smaller radius value r than the class $c_s$ for s; and (3) each $c_{s'}$ is at least as filled as $c_s$. Less formally stated, this means that the MCSC 502 remove samples from classes that are easier to sample from (e.g., because they have a smaller r value) and are already as filled as the current class that is being sampled from. The sample removal process will not introduce infinite loops because it treats the classes hierarchically according to the radius r values.

The MCSC 502 can assess the impossibility of adding another sample in different ways. In one case, the MCSC 502 can define spherical regions struck out by existing samples; the MCSC 502 determines whether it is impossible to add any candidate sample by reference to remaining free space that is not occupied by the spherical regions. Various techniques exist in the art to expedite the determination of free space within a Poisson distribution, any of which can be used herein; for example, one such technique is described in Daniel Dunbar and Greg Humphreys, "A Spatial Data Structure for Fast Poisson-Disk Sample Generation," *Proceedings of ACM SIGGRAPH* 2006, Vol. 25, Issue 3, pp. 503-508. Alternatively, or in addition, the MCSC 502 can use a time-out mechanism to determine whether it is impossible to add any sample. That is, if the MCSC 502 spends too much time seeking a viable candidate sample for a particular class, then the MCSC 502 will eventually declare this task impossible. Hence, "impossible" may correspond to a task that is not practicable given various set-up parameters; "impossible" does not necessarily refer to logical or theoretical impossibility.

In operation 622, the MCSC 502 removes the identified samples $N_s$ if the sample removal component 522 determines that they are removable. In operation 624, the MCSC 502 adds the candidate sample s to the output information, which is now possible because the conflicting samples have been removed.

A.4. r-Matrix Generation Component

FIG. 8 shows a series of operations that implement the r-matrix generation component 518. As summarized above, the r-matrix generation component 518 generates the r-matrix, an example of which was shown in FIG. 7 (for the illustrative case of three classes.) The r-matrix, in turn, defines the intra-class radius values and the inter-class radius values, which together comprise the constraint information which governs the placement of samples in the output information.

In operation 802, the MCSC 502 initializes the diagonal entries in the r-matrix. The diagonal entries provide the intra-class radius values, as supplied by the user or obtained from some other source. Subsequently, the MCSC 502 attempts to generate the inter-class radius values on the basis of the intra-class radius values. (Note that if the off-diagonal entries are set to 0, the sampling operation reduces to the case of decoupled single-class sampling.)

In operation 804, the MCSC 502 organizes all of the classes c into p priority groups $\{P_k\}_{k=0:p-1}$. Each priority group includes one or more classes having the same intra-class radius value $r_i$. The MCSC 502 arranges the priority groups in order of decreasing radius value $r_i$.

In operation 806, the MCSC 502 processes the priority groups one by one. In a first operation 808, the MCSC 502 adds the currently processed priority group $P_k$ to an aggregate group C of classes. In operation 810, the MCSC 502 computes a current aggregate accumulated density D by iterating through the classes i in the priority group $P_k$, updating D in the process. Namely, the accumulated density D is defined as $D+1/r_i^n$, where $r_i^n$ refers to an intra-class radius value, with respect to a sample space of dimensionality n. In operation 812, the MCSC 502 computes the off-diagonal matrix elements r(i, j) by iterating through the classes j in the aggregate group C, with the exclusion of the diagonal entries (i.e., i=j). The off-diagonal entries are computed as $r(i,j) \leftarrow r(j,i) \leftarrow 1/\sqrt[n]{D}$. From a high level perspective, the MCSC 502 leverages the observation that a class $c_i$ with $r_i$ is not negatively affected by another class $c_j$ with $r_j \leq r_i$, as $c_j$ would impact $c_i$'s power spectrum outside its inner ring $1/r_i$. This allows the MCSC 502 to sort all classes into a hierarchy according to their decreasing r value and construct the r-matrix accordingly. Also note that even though the MCSC 502 builds the r-matrix in a priority order according to the r values of the classes, the MCSC 502 generate samples across all classes together instead of in a prioritized order (as described above).

The operation of the r-matrix generation component 518 can be simplified in the case in which there are only two classes, e.g., c=2. Since each class i will have an expected sample density proportional to $1/r_i^n$ in a n-dimensional sample space, the off-diagonal entries $r_o$ of the r-matrix can be computed via the following formula so that the total set has the expected density $\Sigma_{i=0}^{c-1} 1/r_i^n$:

$$\frac{1}{r_o^n} = \sum_{i=0}^{c-1} \frac{1}{r_i^n}. \tag{2}$$

It can be observed, from both an experimental and theoretical standpoint, that an $r_o$ value that deviates from the one computed via Equation (2) will produce worse results. For example, a smaller value will produce a less uniform total sample set, while a larger value will produce less uniform class subsets. Equation (1) can also be extended to compute a uniform off-diagonal r-matrix entry value for c>2 classes if the classes share an identical r value.

However, for c>2 classes with different r values, computing a uniform off-diagonal entry value via Equation (2) will produce suboptimal results. Recall that a Poisson disk sample set possesses a blue noise power spectrum, with an inner ring radius 1/r within which the power spectrum has very low energy. This is a main desirable feature for blue noise, pushing low frequency aliasing towards high frequency noise. However, in multi-class Poisson disk sampling, the power spectrum of a class $c_i$ with radius value $r_i$ could be interfered with by any other class $c_j$ with $r_j>r_i$, as the noise/energy outside the frequency $1/r_j$ of class $c_j$ would fall within the inner ring $1/r_i$ of class $c_i$. Thus, to minimize the pollution inside its inner ring $1/r_i$, each class $c_i$ will wish to ensure that the union of all classes $\{c_j\}$ with $r_j>r_i$ has as uniform a joint distribution as possible.

The operations shown in FIG. 8 achieve the above objective. From a high-level perspective, operation 806 essentially applies Equation (2) to the off-diagonal entries in a sequential fashion so that each accumulated group C over the course of the iterations is as uniform as possible.

A.5. Adaptive Sampling Implementation

The version of the selection functionality 508 described above relies on an r-matrix having constant r values. In another implementation, described in this section, the selection functionality 508 operates based on variable r values. More specifically, the r values can vary in any manner, such as based on the location of each sample within the sampling domain.

FIG. 9 shows operations that can implement the selection functionality 508 for the case of variable r values. The operations within this selection functionality 508 are similar to those described above with respect to FIG. 6. Accordingly, the following explanation will highlight aspects of the operations in FIG. 9 which differ from the counterpart operations shown in FIG. 6. Generally, FIG. 9 shows a modified sample selection component 902, a modified class selection component 904, and a modified sample removal component 906.

As indicated by function definition 908, FIG. 9 represents a variable r value for a class i using the notation $r_i(.)$. The adaptive sampling processing reduces to uniform sampling processing if the input parameters $\{r_i(.)\}_{i=0:c-1}$ are constants.

In operation 910, the MCSC 502 builds the r-matrix using the same approach shown in FIG. 8. But in an adaptive sampling context, the MCSC 502 applies the approach shown in FIG. 8 to every sample location s, e.g., r(s)=BuildRMatrix $(\{r_i(s)\}_{i=0:c-1})$.

In operation 912 (and in operation 914), the MCSC 502 performs the conflict check using $(r(s, c_s, c_{s'})+r(s', c_{s'}, c_s))/2$. This is analogous to the use of (r(s)+r(s'))/2 instead of r for single-class adaptive sampling.

In operation 916, the MCSC 502 performs the sample removal operation based on the sample location s in addition to the sample's class $c_s$. Similar to the uniform sampling algorithm, the tuples $(s, c_s)$ are strictly ordered and thus will not introduce infinite loops in the processing.

A.6. Accelerated Processing Implementation

Various techniques can be used to expedite the above-described processing performed by the MCSC 502. In one example, the MCSC 502 can divide the sampling domain into grid cells so that each cell contains at most one sample. As a result, for uniform sampling, the MCSC 502 can examine a constant number of cells surrounding a new candidate sample when performing a conflict check. The grid cells also provide an efficient structure for determining the available remaining space, e.g., in the context of removing existing samples from the output information.

Figures 12, 13:
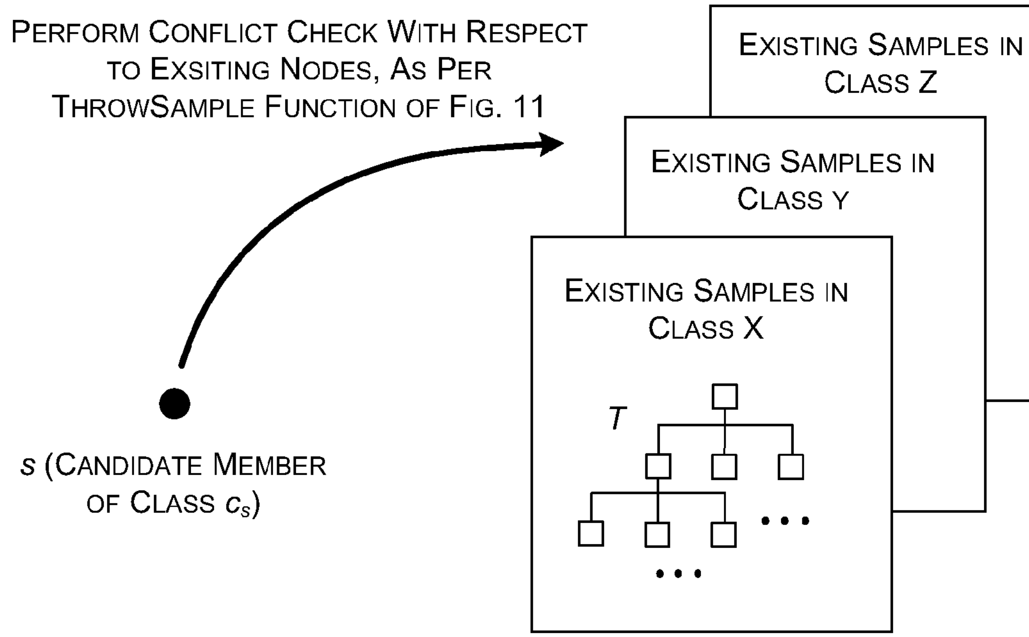

FIGS. 10-12 describe another approach that uses a hierarchical data structure to expedite processing. The hierarchal data structure, or tree for brevity, represents multiple resolutions at which sampling can be performed. General background information on multi-resolution trees in a single-class sampling context can be found in Li-Yi Wei, "Parallel Poisson Disk Sampling," *Proceedings of ACM SIGGRAPH* 2008, Vol. 27, Issue 3, August 2008.

In this implementation, the MCSC 502 includes a modified sample selection component 1002 (in FIG. 10), a subdivide component 1102 and a throw sample component 1104 (in FIG. 11), and a modified sample removal component 1202 (in FIG. 12).

In operation 1004, the MCSC 502 initializes a multi-resolution tree for each sampling class. A multi-resolution tree supports multiple resolutions in the sense that it provides different sized grid cells for receiving samples. The multi-resolution tree is "grown" in iterative fashion in the manner described below.

In operation 1006, the MCSC 502 identifies leaf nodes of the trees for the various classes i. The leaf nodes correspond to the nodes at the highest resolution of the trees, which corresponds to the "lowest" levels of the trees.

In operation 1008, the MCSC 502 provides a random list of leaf nodes for each tree. The MCSC 502 performs processing on the nodes in the random order to improve the quality of output results, e.g., to reduce bias in the output results.

In operation 1010, the MCSC 502 performs an iterative process to add samples to the output information, as selected from multiple classes. As before, the MCSC 502 performs a conflict check to determine whether a randomly selected candidate sample s can be placed among the existing samples s'. And as before, the MCSC 502 can perform a sample removal procedure to remove one or more existing samples in the event that it is impossible to add any candidate sample to an identified class.

In operation 1012, the MCSC 502 selects the class j that is currently the most under-filled in the manner previously described. The MCSC 502 attempts to add a candidate sample s to the identified class j. The class j, in turn, is associated with a particular multi-resolution tree Ti.

In operation 1014, the MCSC 502 assesses whether there are no more leaf nodes to sample from. If so, the MCSC 502 subdivides the tree $T_j$ to provide another level of leaf nodes to process. In performing this operation 1012, the MCSC 502 calls on the subdivide component 1102 of FIG. 11. As shown in operation 1106 of that figure, for a particular existing leaf node, the MCSC 502 determines whether a prescribed cell division criterion is satisfied. If so, in operation 1108, the MCSC 502 divides this existing leaf node into $2^n$ new child nodes (where n is the dimension of the sampling domain Ω). In operation 1110, the MCSC 502 migrates an existing sample into a newly created child cell. This process is performed with respect to all of the existing leaf nodes in the tree.

Returning to FIG. 10, in operation 1016, the MCSC 502 invokes a ThrowSample function which attempts to add a sample to the identified class. FIG. 11 shows the throw sample component 1104 which implements this operation. Here, the MCSC 502 operates in the basic manner described above by determining whether the placement of the new candidate sample s will satisfy constraint information defined by the r-matrix, in view of existing samples s' in the various classes. In this case, however, the MCSC 502 performs a conflict check across multiple trees having multiple resolutions.

Since the number of samples stored in each tree can differ, the MCSC 502 subdivides the trees on demand (instead of all together) in the manner described above. This means that, at any time, the trees can have different numbers of levels. When s is generated from its own (same class) tree $T_s$, s is drawn from a highest resolution leaf cell $\square_s$. However, when s is conflict-checked against a different tree T, $\square_s$ might not even have a twin cell in T, or the twin cell may exist but is not provided at the highest resolution of T. This situation is addressed in the following manner.

Assume that the MCSC 502 generates a candidate sample s at level l from $T_s$. In a single class situation, the MCSC 502 can perform a conflict check by looking at, for each resolution l' from l to 0, a set of cells within $3\sqrt{n}\,\mu(l')$ distance from the ancestor cell $\square$ (l') containing s. In the case of multiple classes, the MCSC 502 performs a conflict check by examining cells within the same vicinity of the ancestor cells, not only within the same tree $T_s$ but also within each other tree T. To accommodate the aforementioned situations, the MCSC 502 examines just the cells that actually exist in T Further, if $l_{max}(T)>l$, for any non-leaf cell $\square$ at level l of T, the MCSC 502 examines all samples contained within its sub-tree. (This situation does not arise for $T_s$, as $l_{max}(T_s)=1$.)

The throw sample component 1104 indicates that either of two tests can be used to perform the conflict check. A first conflict check takes the maximum of $r(s, c_s, c_{s'})$ and $r(s', c_{s'}, c_s)$. A second conflict check relies on the same mean metric computation described above with respect to FIG. 9.

FIG. 13 provides a high-level depiction of the conflict check performed by the throw sample component 1104. As shown, the MCSC 502 compares a candidate sample s with existing samples in its own class and other classes. Each class organizes its samples in a tree data structure in the manner described above.

Returning to FIG. 10, in operation 1018, after performing the conflict check, the MCSC 502 adds the candidate sample s to an appropriate cell in its tree data structure.

In operation 1020, the MCSC 502 performs the sample removal procedure described above if it is determined that it is impossible to add another sample to the class. This removal procedure invokes the modified sample removal component 1202 of FIG. 12. In one case, the MCSC 502 can perform an estimation to assess whether it is impossible to add another sample to a class. For example, the MCSC 502 can use the above-described grid or tree to track the available regions. For each newly added sample s in class i, the MCSC 502 can strike out cells for class j that are entirely within the spherical region centered at s with radius r(s, i, j). This procedure works for both uniform and adaptive sampling. Note that cells are being stricken out here only for the sake of estimating impossibility; they are not being removed from the candidate list of nodes E to process.

As a final aspect, the MCSC 502 can also perform aspects of its processing in parallel to further expedite its sampling operation. For example, the MCSC 502 can perform sampling with respect to one group of nodes in parallel with another group of nodes. The MCSC 502 can select such groups of nodes to ensure that the processing performed on one group will not interfere with the processing performed on another group.

A.7. Illustrative Applications

Figure 14:
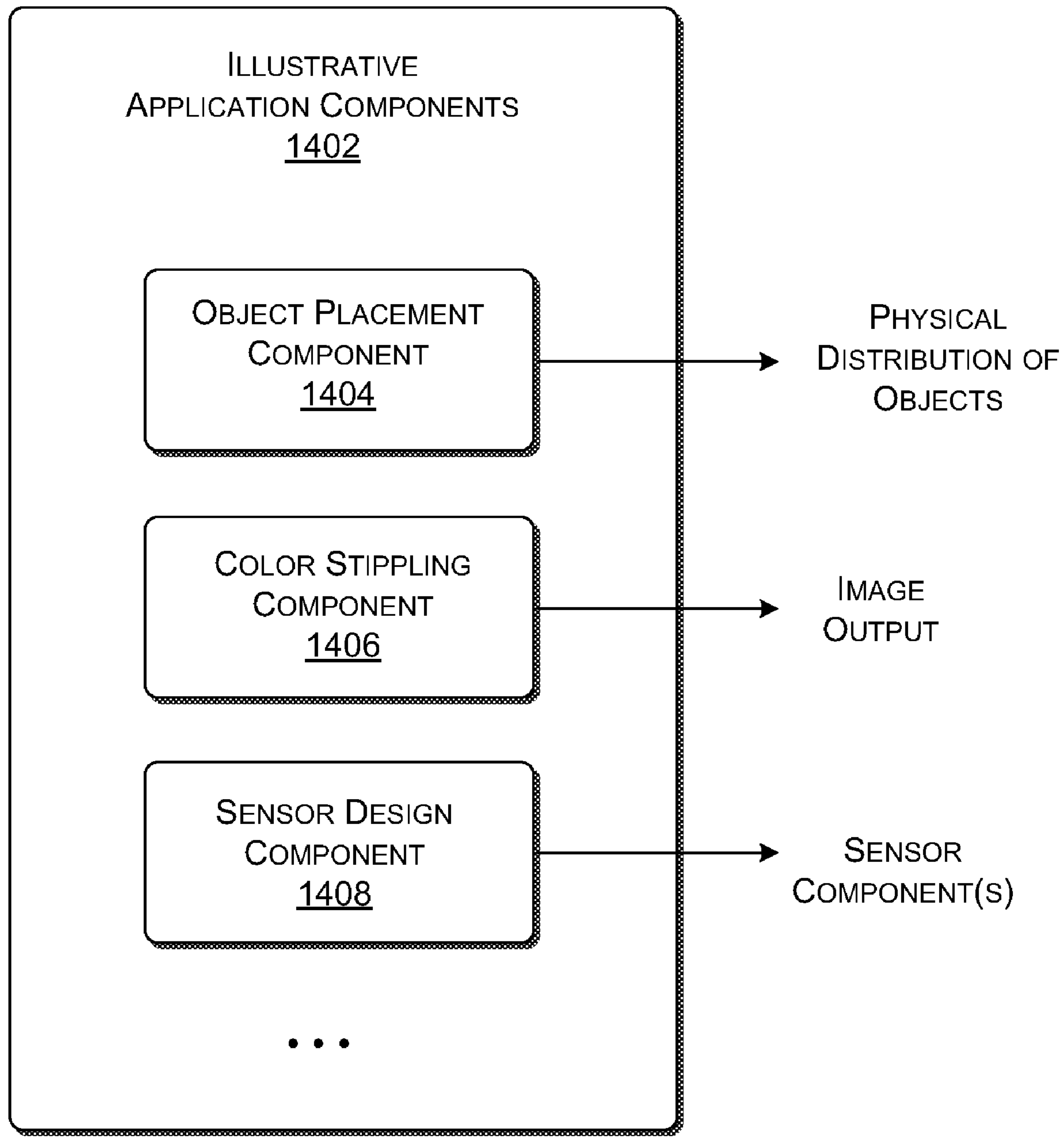
FIG. 14 shows illustrative application components that can make use of the output information produced by the MCSC of FIG. 5.

FIG. 5 indicates that any application component 514 can make use of the processing performed by the MCSC 502. Generally stated, the application component 514 uses the sampling technique provided by the MCSC 502 to determine a distribution of items. Depending on the application context, an item can refer to any type of physical entity, any type of abstract entity, etc. FIG. 14 shows a non-exhaustive and representative collection of application components 1402. Any of these application components 1402 can rely on uniform sampling or adaptive sampling, or a combination thereof. Moreover, any of these application components 1402 can rely on any type of acceleration technique to expedite the generation of samples.

An object placement component 1404 uses the MCSC 502 to select locations within a sampling domain at which it can place objects of different types. In this scenario, each type of object corresponds to a different sampling class. As a result of this processing, the objects within a particular class can be organized in accordance with a Poisson distribution. Moreover, the entire set of objects can exhibit a Poisson distribution. No limitation is placed on the nature of objects that can be placed by the object placement component 1404; the objects may include non-animate objects, animate objects, natural objects, manmade object, abstract objects, and so on.

A color stippling component 1406 uses the MCSC 502 to provide a stippling effect in an image (associated with small dots or other elements added to the image to produce a desired visual effect). In the present context, the color stippling component 1406 can use a color image as an input importance field to govern an adaptive sampling operation. Further, the color stippling component 1406 can treat different color channels as respective sampling classes. The color dots in the output information can be expected to follow the input importance field, as well as maintain a Poisson distribution (both with respect to individual classes and the entire set of samples). In one case, the color dots are not allowed to overlap. In another case, the color dots are permitted to overlap.

More generally, any type of graphics operation can make use of the MCSC 502, such as dithering, rendering, geometry processing, etc.

A sensor design component 1408 uses the MCSC 502 to govern various aspects of the design of a sensor. For example, the sensor design component 1408 can use the MCSC 502 to determine the layout of sensor elements within a sensor array. For example, the sensor design component 1408 can use the MCSC 502 to select the locations of red (R), green (G), and blue (B) sensor elements within a sample space associated with a color sensor array. These different types of sensor elements correspond to different respective samples classes. By virtue of the Poisson distribution, the MSCS 502 may produce a sensor array having desirable noise-related behavior relative to other sensor designs (such as a Penrose pixel approach).

The sensor design component 1408 can also use the MCSC 502 to design a filter array which works in conjunction with a sensor array. In this context, the sensor design component 1408 operates to de-regularize the layout of filter elements in the filter array. This may be desirable because it accommodates the production of a sensor array having a traditional grid sensor layout, which is easier to fabricate than an irregular layout of elements. That is, the sensor design component 1408 can achieve de-regularization of output results within the filter array, rather than the sensor array itself. In an alternative case, the sensor design component 1408 can apply the MCSC 502 to both the sensor array and the filter array.

In one case, the sensor design component 1408 can provide a filter array by operating on a sampling domain that includes a discrete set of samples associated with a regular layout of sensor elements. Or the sensor design component 1408 can draw each sample from a continuous domain but snap the sample to a nearest cell center before drawing another one. To ensure that each underlying sensor element is utilized, the sensor design component 1408 can gradually decrease the r value(s) throughout the sampling process. Background information on a technique which reduces the r-value in a single-class context can be found in Michael McCool and Eugene Fiume, "Hierarchical Poisson Disk Sampling Distributions," in *Proceedings of the Conference on Graphics Interface '92*, 1992, pp. 94-105.

B. Illustrative Processes

FIGS. 15-18 show procedures that explain the operation of the systems of Section A. Since the principles underlying the operation of the systems have already been described in Section A, certain operations will be addressed in summary fashion in this section.

Figure 15:
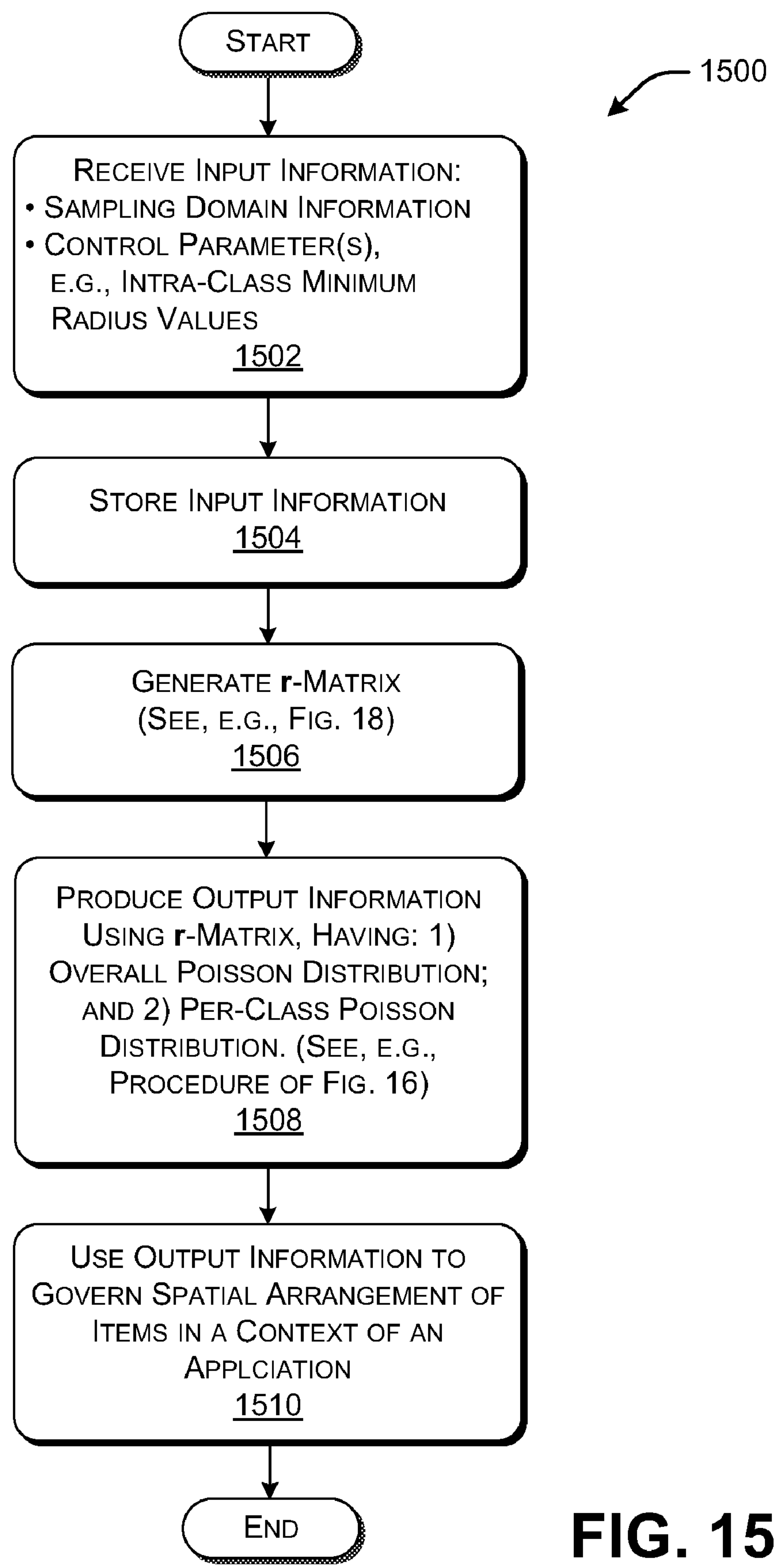
FIG. 15 is a flowchart that provides an overview of one manner of operation of the MCSC of FIG. 5.

Starting with FIG. 15, this figure shows an illustrative procedure 1500 which describes an overview of the operation of the MCSC 502 of FIG. 5.

In block 1502, the MCSC 502 receives input information. The input information may provide information regarding the sampling domain, along with one or more intra-class radius values.

In block 1504, the MCSC 502 can store the input information.

In block 1506, the MCSC 502 can generate the r-matrix.

In block 1508, the MCSC 502 can produce multi-class output information using the r-matrix. The output information has a Poisson distribution from both a global perspective and a per-class perspective.

In block 1510, an application component 514 can use the output information provided by the MCSC 502 in the context of any application-specific environment.

Figure 16:
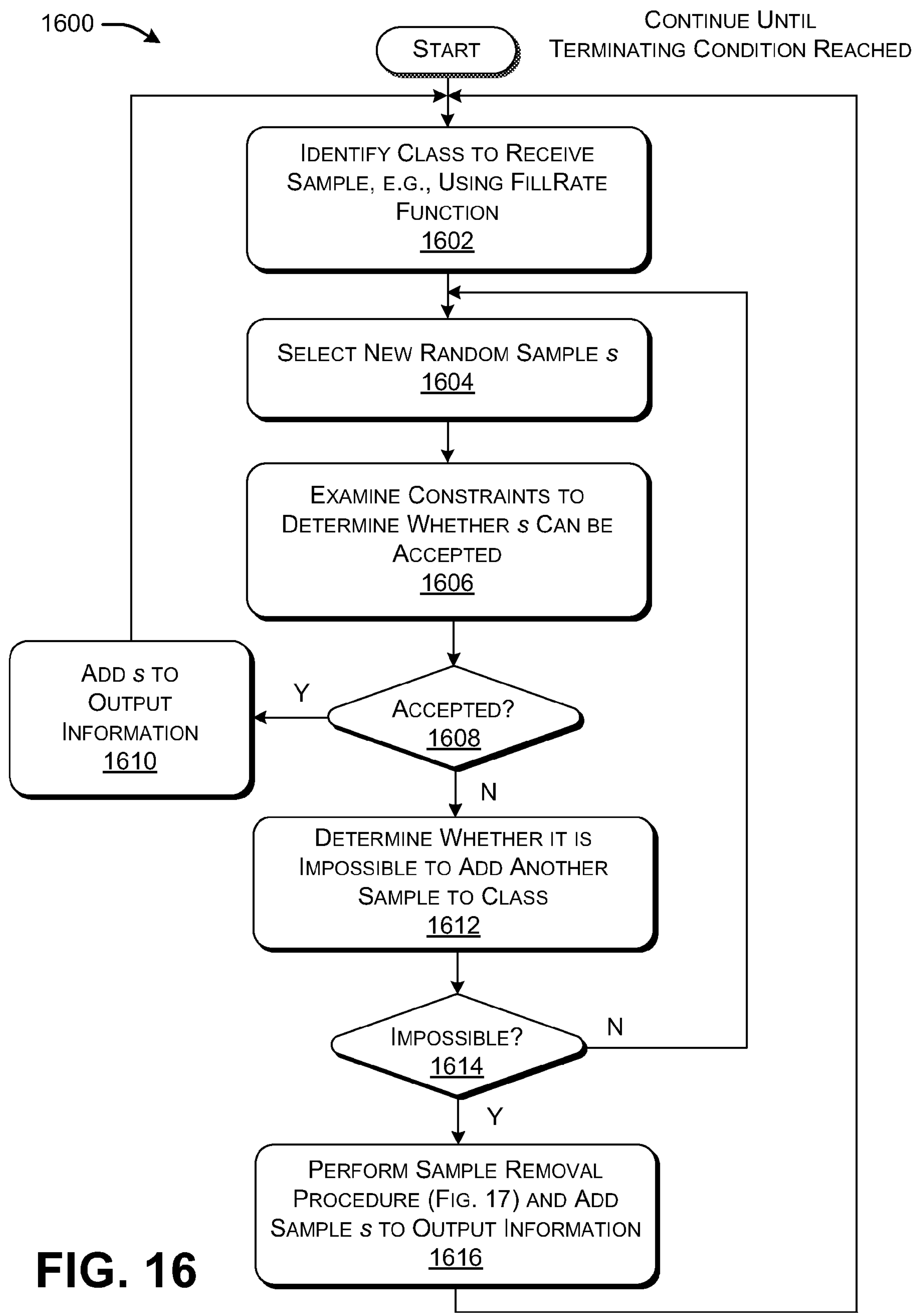
FIG. 16 is a flowchart that describes one manner in which the MCSC of FIG. 5 can add samples to the output information, subject to constraint information.

FIG. 16 shows a procedure 1600 that provides further details regarding block 1508 of FIG. 15, in which the MCSC 502 pulls samples from various classes to provide the output information.

In block 1602, the MCSC 502 identifies a class for which a candidate sample s will be generated, e.g., by identifying the most under-filled class at that particular moment in time.

In block 1604, the MCSC 502 selects a random sample s within the sampling domain, e.g., using a dart-throwing approach.

In blocks 1606 and 1608, the MCSC 502 determines whether the placement of the candidate sample s within the output information will satisfy the constraint information defined by the r-matrix.

In block 1610, the MCSC 502 adds the candidate sample s to the output information in the case of an affirmative constraint-checking result.

In blocks 1612 and 1614, for a negative constraint-checking result, the MCSC 502 determines whether it is impossible to add any additional candidate sample to the output information.

In block 1616, the MCSC 502 performs a sample removal procedure to identify and remove one or more existing samples from the output information, upon which it can then add the candidate sample s to the output information.

Figure 17:
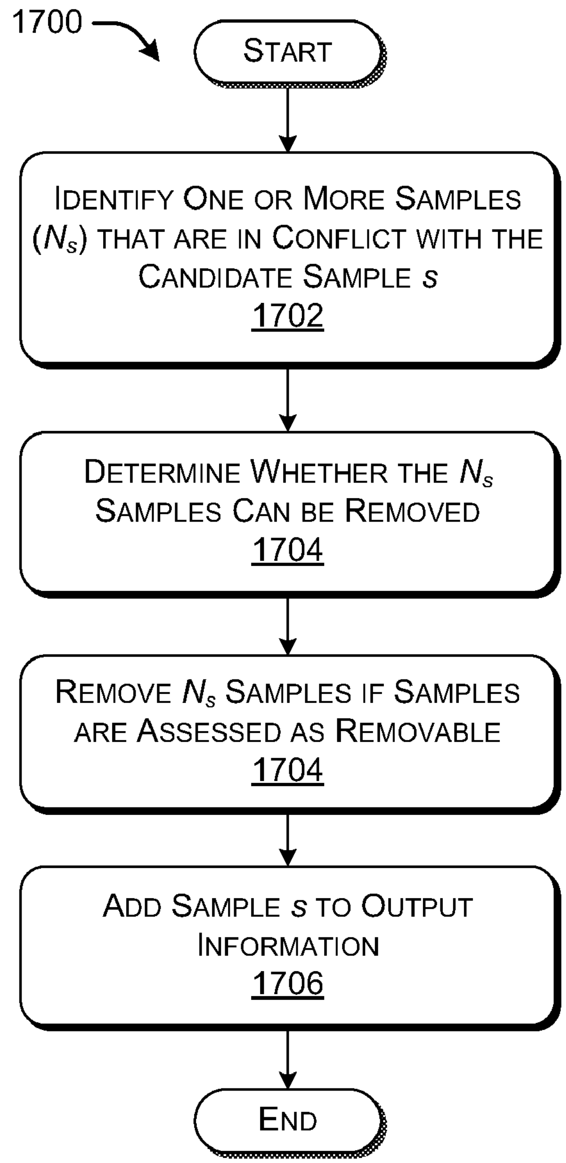
FIG. 17 is a flowchart that describes one manner in which the MCSC of FIG. 5 can remove existing samples from the output information.

FIG. 17 describes a procedure 1700 for performing the removal procedure of block 1616 of FIG. 16.

In block 1702, the MCSC 502 determines one or more existing samples ($N_s$) that are in conflict with the candidate sample s.

In block 1704, the MCSC 502 determines whether it is appropriate to remove these one or more existing samples. The MCSC 502 can use the multi-factor test described above in making this determination.

In block 1706, the MCSC 502 removes the samples if the multi-factor test returns an affirmative result.

In block 1708, the MCSC 502 adds the candidate sample s to the output information.

Figure 18:
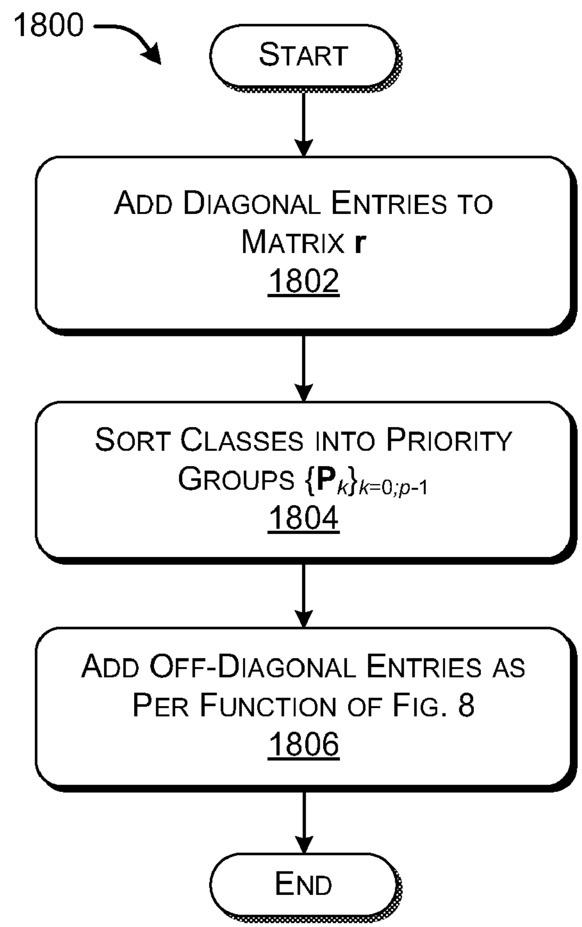
FIG. 18 is a flowchart that describes one manner in which the MCSC of FIG. 5 can generate the r-matrix.

FIG. 18 describes a procedure 1800 for creating the r-matrix.

In block 1802, the MCSC 502 adds diagonal entries to the r-matrix corresponding to intra-class radius values. In one case, a user can manually supply these intra-class radius values as input information.

In block 1804, the MCSC 502 can sort the classes into priority groups $\{P_k\}$. Each group has the same r value. The MCSC 502 sorts the groups in order of descending r value.

In block 1806, the MCSC 502 adds the off-diagonal entries in the r-matrix based on the functionality described above with respect to FIG. 8.

C. Representative Processing Functionality

FIG. 19 sets forth illustrative electrical data processing functionality 1900 that can be used to implement any aspect of the functions described above. With reference to FIG. 5, for instance, the type of processing functionality 1900 can be used to implement any aspect of the MCSC 502. In one case, the processing functionality 1900 may correspond to any type of computer device or other electrical apparatus that includes one or more processing devices.

The processing functionality 1900 can include volatile and non-volatile memory, such as RAM 1902 and ROM 1904, as well as various media devices 1906, such as a hard disk module, an optical disk module, and so forth. The processing functionality 1900 also includes one or more general-purpose processing devices 1908, as well as one or more special-purpose processing devices, such as one or more graphical processing units (GPUs) 1910. The processing functionality 1900 can perform various operations identified above when the processing devices (1908, 1910) execute instructions that are maintained by memory (e.g., RAM 1902, ROM 1904, or elsewhere). More generally, instructions and other information can be stored on any computer readable medium 1912, including, but not limited to, static memory storage devices, magnetic storage devices, optical storage devices, and so on. The term computer readable medium also encompasses plural storage devices. The term computer readable medium also encompasses signals transmitted from a first location to a second location, e.g., via wire, cable, wireless transmission, etc.

The processing functionality 1900 also includes an input/output module 1914 for receiving various inputs from an environment (and/or from a user) via input modules 1916 (such as one or more key input devices, one or more mouse-type input devices, etc.). The input/output module 1914 also provides various outputs to the user via output modules. One particular output mechanism may include a presentation module 1918 and an associated graphical user interface (GUI) 1920. The processing functionality 1900 can also include one or more network interfaces 1922 for exchanging data with other devices via one or more communication conduits 1924. One or more communication buses 1926 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for using an electrical apparatus for producing output information, comprising:

receiving input information including sampling domain information, the sampling domain information describing a sampling domain;

producing output information by randomly selecting samples from the sampling domain to fill at least two sample classes, subject to constraint information; and using the output information to provide a spatial arrangement of items in a context of an application, the output information exhibiting an overall Poisson distribution of samples, each sample class further exhibiting a Poisson distribution of samples.

2. The method of claim 1, wherein said receiving further comprises receiving intra-class radius information, the intra-class radius information describing, for each sample class, a minimum separation between same-class samples.

3. The method of claim 2, wherein the method further comprises generating inter-class radius information, the inter-class radius information describing, for each pair of sample classes, a minimum separation between different-class samples.

4. The method of claim 1, wherein said producing comprises identifying a sample class that is currently most under-filled among said at least two sample classes, to provide an identified sample class.

5. The method of claim 4, wherein said producing further comprises:

generating a candidate sample s from the sampling domain using a random selection technique;

determining whether the candidate sample s is at least a prescribed distance away from each existing sample s' in the output information, as defined by the constraint information, to provide a constraint-checking result; and adding the candidate sample s to the identified sample class of the output information in a case of an affirmative constraint-checking result.

6. The method of claim 5, further comprising generating another candidate sample s and repeating said determining and adding in a case of a negative constraint-checking result.

7. The method of claim 5, further comprising, in a case of a negative constraint-checking result:

assessing whether it is impossible to add any candidate sample to the identified sample class;

determining one or more existing samples to be removed;

removing said one or more existing samples; and adding the candidate sample s to the identified sample class of the output information.

8. The method of claim 1, wherein the constraint information is based on constant radius information, the constant radius information specifying constant minimum separation distances that constrain the placement of samples in the output information.

9. The method of claim 1, wherein the constraint information is based on spatially-varying radius information, the spatially-varying radius information specifying variable minimum separation distances that constrain the placement of samples in the output information.

10. The method of claim 1, wherein said producing employs a multi-resolution sample-selection technique to expedite selection of samples.

11. The method of claim 1, wherein the application is an object placement application, and the items correspond to physical objects.

12. The method of claim 1, wherein the application is a color stippling application, and the items correspond to color elements placed within an output image.

13. The method of claim 1, wherein the application is a sensor design application, and the items correspond to sensor elements.

14. The method of claim 1, wherein the application is a sensor design application, and the items correspond to filter elements.

15. A multi-class sampling component, implemented by electrical data processing functionality having at least one processing device, for producing output information, comprising:

an information receiving component configured to receive and store input information, the input information including:

sampling domain information, the sampling domain information describing a sampling domain; and intra-class radius information, the intra-class radius information describing a minimum separation between same-class samples in each of at least two sample classes;

a store for storing the input information; and selection functionality configured to produce output information by randomly selecting samples from the sampling domain to fill said least two sample classes, subject to constraint information, the constraint information being based on the intra-class radius information, the output information exhibiting an overall Poisson distribution of samples, each sample class further exhibiting a Poisson distribution of samples the information receiving component and selection functionality being implemented by the electrical data processing functionality having at least one processing device.

16. The multi-class sampling component of claim 15, wherein the selection functionality includes a matrix generation component that is configured to generate inter-class radius information describing, for each pair of sample classes, a minimum separation between different-class samples, wherein the intra-class radius information and the inter-class radius information define the constraint information, the matrix generation component being implemented by the electrical data processing functionality having at least one processing device.

17. The multi-class sampling component of claim 15, wherein the selection functionality includes a sample removal component that is configured to remove one or more existing samples of the output information in a course of producing the output information, the sample removal component removing said one or more existing samples when it is determined that it is impossible to add a new candidate sample to an identified sample class of the output information, the sample removal component being implemented by the electrical data processing functionality having at least one processing device.

18. The multi-class sampling component of claim 15, wherein the selection functionality includes a class selection component that is configured to determine, in a course of producing the output information, which sample classes are to receive samples, the class selection component being implemented by the electrical data processing functionality having at least one processing device.

19. A computer readable storage medium for storing computer readable instructions, the computer readable instructions providing a multi-class sampling component when executed by one or more processing devices, the multi-class sampling component producing output information having at least two sample classes, the computer readable instructions comprising:

a logic component configured to select a sample class that is currently most under-filled among said at least two sample classes, to provide an identified sample class;

a logic component configured to generate a candidate sample s from a sampling domain using a random selection technique, the candidate sample s being associated with the identified sample class;

a logic component configured to determine whether the candidate sample s is at least a prescribed distance away from each existing sample s' in the output information, as defined by constraint information, to provide a constraint-checking result;

a logic component configured to add the candidate sample s to the identified sample class of the output information in a case of an affirmative constraint-checking result; and a logic component configured to determine, for a negative constraint-checking result, whether it is impossible to add any candidate sample to the identified sample class, and if so, to:

determine one or more existing samples to be removed;

remove said one or more existing samples; and add the candidate sample s to the identified sample class of the output information, the output information exhibiting an overall Poisson distribution of samples, and each sample class further exhibiting a Poisson distribution of samples.

* * * * *